(12) United States Patent
Harada et al.

(10) Patent No.: US 8,998,400 B2
(45) Date of Patent: Apr. 7, 2015

(54) COPOLYMER, AQUEOUS INK, AND INK CARTRIDGE

(71) Applicants: Shigeyuki Harada, Shizuoka (JP); Tamotsu Aruga, Shizuoka (JP); Hiroshi Gotou, Shizuoka (JP); Hidetoshi Fujii, Shizuoka (JP)

(72) Inventors: Shigeyuki Harada, Shizuoka (JP); Tamotsu Aruga, Shizuoka (JP); Hiroshi Gotou, Shizuoka (JP); Hidetoshi Fujii, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/154,595

(22) Filed: Jan. 14, 2014

(65) Prior Publication Data

US 2014/0198160 A1   Jul. 17, 2014

(30) Foreign Application Priority Data

| Jan. 15, 2013 | (JP) | 2013-004959 |
| Jun. 21, 2013 | (JP) | 2013-130578 |
| Sep. 2, 2013 | (JP) | 2013-181632 |
| Nov. 15, 2013 | (JP) | 2013-236884 |

(51) Int. Cl.

| *B41J 2/01* | (2006.01) |
| *C09D 11/30* | (2014.01) |
| *B41J 2/21* | (2006.01) |
| *C08F 222/16* | (2006.01) |
| *C09D 11/10* | (2014.01) |
| *C08F 8/14* | (2006.01) |
| *B41J 2/175* | (2006.01) |

(52) U.S. Cl.
CPC ............... *C09D 11/30* (2013.01); *B41J 2/2107* (2013.01); *C08F 222/16* (2013.01); *C09D 11/10* (2013.01); *C08F 8/14* (2013.01); *B41J 2/17503* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/40; C09D 11/30; C09D 11/38; C09D 11/322; C09D 11/328; C09D 11/101; C09D 11/005; C09D 11/54; C09D 11/52
USPC ...................... 347/95, 100, 96, 88, 99, 20, 21; 106/31.6, 31.13, 31.27; 523/160, 161
See application file for complete search history.

(56) References Cited

U.S. PATENT DOCUMENTS

| 7,172,276 B2 * | 2/2007 | Breton et al. ................... 347/100 |
| 7,202,883 B2 * | 4/2007 | Breton et al. ................... 347/95 |
| 2005/0206703 A1 | 9/2005 | Guo et al. |
| 2010/0261103 A1 * | 10/2010 | Sasaki et al. ...................... 430/7 |

FOREIGN PATENT DOCUMENTS

| EP | 0889102 A2 | 1/1999 |
| JP | 3-160068 | 7/1991 |
| JP | 2002-294105 | 10/2002 |
| JP | 2003-342520 | 12/2003 |
| JP | 2004-066047 | 3/2004 |
| JP | 2006-052027 | 2/2006 |
| JP | 2006-188624 | 7/2006 |
| JP | 2008-536963 | 9/2008 |
| JP | 2012-036287 | 2/2012 |
| JP | 2012-052027 | 3/2012 |
| JP | 2012-149108 | 8/2012 |
| JP | 2012-153890 | 8/2012 |
| WO | WO2006/099551 A2 | 9/2006 |

OTHER PUBLICATIONS

European Search Report dated Mar. 31, 2014 in corresponding European patent application No. 14 15 0281.5.

\* cited by examiner

*Primary Examiner* — Manish S Shah

(74) *Attorney, Agent, or Firm* — Cooper & Dunham LLP

(57) ABSTRACT

A copolymer contains repeating units represented by the following chemical formulae 1 and 2:

Chemical formula 1 and 2

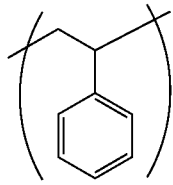

(1)

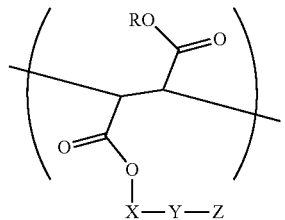

(2)

In the chemical formulae 1 and 2, R represents a hydrogen atom or a cation; X represents an alkylene group having 2 to 18 carbon atoms; Y represents a single bond, an oxycarbonyl group [(X)—O—CO—(Z)], a carbonyloxy group [(X)—CO—O—(Z)], an ether group (—O—), or an imido group [(X)—N—CO—(—CO—)(Z)]; and Z represents a biphenyl group or a naphthyl group).

8 Claims, 8 Drawing Sheets

A

B

C

D

E

COPOLYMER, AQUEOUS INK, AND INK CARTRIDGE

CROSS-REFERENCE TO RELATED APPLICATIONS

This patent application is based on and claims priority pursuant to 35 U.S.C. §119 to Japanese Patent Application Nos. 2013-004959, 2013-181632, 2013-130578, and 2013-236884, filed on Jan. 15, 2013, Sep. 2, 2013, Jun. 21, 2013, and Nov. 15, 2013, respectively, in the Japan Patent Office, the entire disclosures of which are hereby incorporated by reference herein.

BACKGROUND

1. Technical Field

The present invention relates to a novel copolymer that is useful as a binder resin or a pigment dispersion resin of an aqueous ink, and an aqueous ink and an ink cartridge that include the copolymer.

2. Background Art

The inkjet recording system is advantageous in that, compared with other recording systems, the process is simple, full-color printing is easily achieved, and high-resolution images can be obtained even with an apparatus having a simple configuration. For this reason, the inkjet recording system is becoming common and spreading from personal use to office use and fields of commercial printing and industrial printing. In such an inkjet recording system, aqueous ink compositions containing water-soluble dyes as colorants are mainly used. However, the water-soluble dyes have drawbacks of having insufficient water resistance and light resistance. Accordingly, pigment inks that contain water-insoluble pigments instead of water-soluble dyes are being studied.

In inkjet printing for office use, conventional paper sheets are mainly used as recording media and high image density is required. In general, when printing is performed to apply pigment ink onto a conventional paper sheet, the pigment does not stay on the surface of the paper sheet and permeates into the paper sheet; and, as a result, the pigment density on the surface of the paper sheet becomes low and the image density becomes low. By increasing the pigment concentration of the ink, the image density can be increased. However, the viscosity of the ink is increased and discharge stability is degraded.

Immediately after pigment ink is discharged onto a conventional paper sheet, water in the ink causes swelling of the surface of the paper sheet and the difference in extension ratios of the front and back surfaces of the paper sheet becomes large, resulting in a problem of curling of the paper sheet. This phenomenon disappears as the paper sheet dries. Accordingly, the phenomenon has not been regarded as a problem in low-speed printing. However, with the increase in the printing speed, recording media that remain in a curled state due to printing need to be transported. As a result, a problem of a paper jam may be caused. In order to prevent this, a method of adding a penetrating agent to the ink may be effective to allow quick permeation of water into paper sheets; however, the ink becomes hydrophobic and hence it becomes difficult to ensure the storage stability of the ink; in addition, the permeability of the pigment into the recording media is also increased and the image density is further decreased.

In order to address such problems, various techniques for making pigment stay on the surfaces of paper sheets have been proposed. For example, JP-2009-513802-A proposes an inkjet ink that contains a liquid vehicle, a colorant, and a polymer having at least one functional group having a specific calcium index. This proposal states that a monomer forming the polymer is 4-methacrylamido-1-hydroxybutane-1,1-diphosphonic acid; when the colorant is brought into contact with a paper sheet, the colorant is destabilized by the diphosphonic acid group of the polymer and Ca salts in the paper sheet to thereby improve images. However, the ink has a problem of having low storage stability.

JP-2012-051367-A proposes an inkjet recording method of making a receiving solution containing a Ca salt adhere to paper sheets and performing printing with an ink containing a pigment to which a phosphorus-containing group is bonded, a resin emulsion, and a surfactant. This proposal states that the Ca salt of the receiving solution reacts with the phosphorus-containing group to thereby achieve improvements in terms of feathering and fixability. However, in recording on conventional paper sheets, the effect of increasing the image density is not sufficiently provided.

In the fields of commercial printing and industrial printing, there is a demand for techniques that allow stable formation of images having higher resolution and definition at a higher speed. Recording media used are, for example, conventional paper sheets, coated paper sheets, art paper sheets, and impermeable films such as PET films. Accordingly, there is a demand for ink having high versatility for such recording media.

When images having high resolution and definition are formed at a high speed on various recording media, in particular, slightly permeable media such as coated paper sheets and art paper sheets or impermeable films, beading (unevenness) tends to be caused. To address this, JP-H3-160068-A proposes an ink that has a minimum film forming temperature of 40° C. or more and at least contains, as fixing agents, wax emulsion, resin emulsion, latex, organic ultrafine particles, and inorganic ultrafine particles.

JP-2006-188624-A proposes an inkjet ink at least containing water, an organic solvent, and a polymer, wherein the polymer contained in the ink or in the ink from which a portion of water has been evaporated exhibits UCST-type phase separation in the range of 0° C. to 100° C.

JP-2008-536963-A proposes an ink containing a jettable vehicle; a plurality of pigment solids self-dispersed in the vehicle; and a half-ester of styrene maleic anhydride (SMA) dispersed in the vehicle.

In addition, JP-2012-52027-A proposes a method of changing rheological behavior of ink in response to pH change by using a pH-responsive polymer including plural hydrophilic segments in side chains and plural pH-responsive segments that become hydrophilic or hydrophobic in response to pH values.

However, when the existing inks described above are used, it is difficult to form images on various recording media at a high speed without causing beading (unevenness).

As in the inkjet recording system described above, aqueous pigment inks containing pigments as colorants in writing implements such as marking pens, ballpoint pens, and plotter pens have a problem of exhibiting low color density on conventional paper sheets, in particular, on white conventional paper sheets, compared with dye inks. In order to address this problem, JP-2005-298802-A proposes an aqueous pigment ink containing O/W emulsion of water-insoluble (meth) acrylic resin and/or styrene-(meth)acrylic acid having an average particle size of 50 to 200 nm and a minimum film forming temperature of 50° C. or more, urea or a urea derivative, water, pigment, an aqueous resin, and a phosphate surfactant. However, the effect of increasing the color density is not sufficiently provided.

SUMMARY

The present invention provides a copolymer containing repeating units represented by the following chemical formulae 1 and 2:

Chemical formula 1 and 2

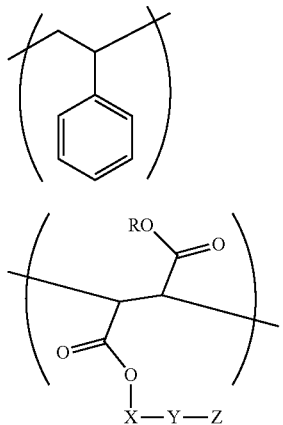

(1)

(2)

where R represents a hydrogen atom or a cation; X represents an alkylene group having 2 to 18 carbon atoms; Y represents a single bond, an oxycarbonyl group [(X)—O—CO—(Z)], a carbonyloxy group [(X)—CO—O—(Z)], an ether group (—O—), or an imido group [(X)—N—CO—(—CO—)(Z)]; and Z represents a biphenyl group or a naphthyl group).

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
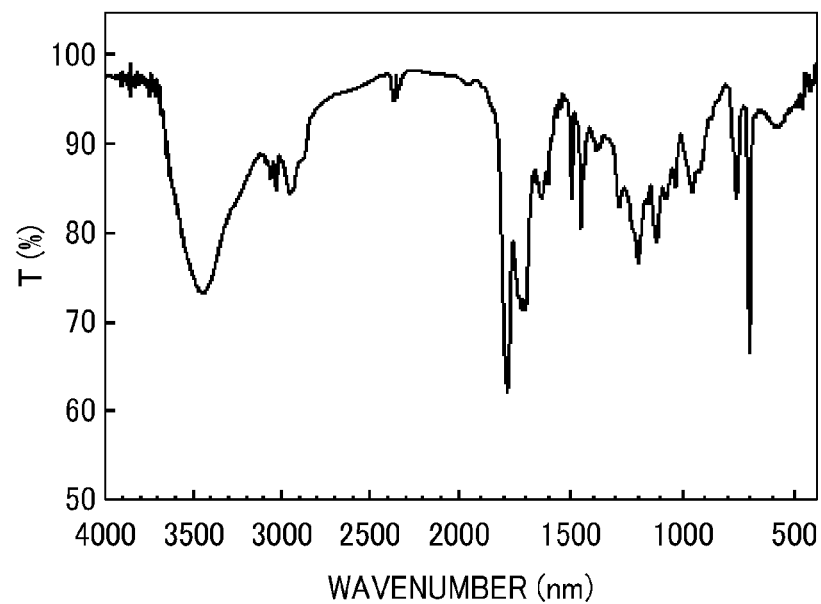
FIG. 1 is a graph illustrating the infrared absorption spectrum (KBr pellet method) of Copolymer 1 according to an embodiment of the present invention.

The present invention is to provide a copolymer that is useful as a binder resin or a pigment dispersion resin of an aqueous ink The copolymer includes repeating units represented by the above-described chemical formulae 1 and 2. In the chemical formula 2, R represents a hydrogen atom or a cation. When R represents a cation, the oxygen next to the cation is present as Examples of the cation include sodium ion, potassium ion, lithium ion, tetramethylammonium ion, tetraethylammonium ion, tetrapropylammonium ion, tetrabutylammonium ion, tetrapentylammonium ion, tetrahexylammonium ion, triethylmethylammonium ion, tributylmethylammonium ion, trioctylmethylammonium ion, 2-hydroxyethyltrimethylammonium ion, tris(2-hydroxyethyl)methylammonium ion, propyltrimethylammonium ion, hexyltrimethylammonium ion, octyltrimethylammonium ion, nonyltrimethylammonium ion, decyltrimethylammonium ion, dodecyltrimethylammonium ion, tetradecyltrimethylammonium ion, hexadecyltrimethylammonium ion, octadecyltrimethylammonium ion, didodecyldimethylammonium ion, ditetradecyldimethylammonium ion, dihexadecyldimethylammonium ion, dioctadecyldimethylammonium ion, ethylhexadecyldimethylammonium ion, ammonium ion, dimethylammonium ion, trimethylammonium ion, monoethylammonium ion, diethylammonium ion, triethylammonium ion, monoethanolammonium ion, diethanolammonium ion, triethanolammonium ion, methylethanolammonium ion, methyldiethanolammonium ion, dimethylethanolammonium ion, monopropanolammonium ion, dipropanolammonium ion, tripropanolammonium ion, isopropanolammonium ion, morpholinium ion, N-methylmorpholinium ion, N-methyl-2-pyrrolidonium ion, and 2-pyrrolidonium ion.

X represents an alkylene group having 2 to 18 carbon atoms; Y represents a single bond, an oxycarbonyl group [(X)—O—CO—(Z)], a carbonyloxy group [(X)—CO—O—(Z)], an ether group (—O—), or an imido group [(X)—N—CO—(—CO—)(Z)]; and Z represents a biphenyl group or a naphthyl group.

Specifically, in the chemical formula 2, the end group Z that is a biphenyl group or a naphthyl group is bonded through Y and X serving as bonding groups to the carboxyl group. Such a biphenyl group or a naphthyl group present at the end has high pigment adsorption capability due to π-π stacking with pigment serving as a colorant in the aqueous ink (hereafter, sometimes referred to as ink). Accordingly, by contacting such a group with pigment on a printing medium during printing, pigment aggregation rapidly occurs on the surface of the printing medium to thereby suppress beading (unevenness). In particular, Z in the chemical formula 2 preferably represents a naphthyl group from the viewpoint of the capability of adsorbing pigment.

A copolymer according to the present invention, which includes repeating units represented by the above-described chemical formulae 1 and 2, may further include a repeating unit represented by the above-described chemical formula 3.

By adding a repeating unit represented by the chemical formula 3, the glass transition temperature of the copolymer is decreased; after an ink droplet containing this copolymer is discharged onto a recording medium, while the ink permeates the paper sheet and water evaporates, pigment aggregation more rapidly occurs to thereby provide images having high resolution and definition without the occurrence of beading (unevenness) in high-speed printing. In the chemical formula 3, R1 represents a hydrogen atom or a methyl group and R2 represents an alkyl group having 2 to 23 carbon atoms, preferably a butyl group.

When a pigment dispersion containing pigment dispersed in water is prepared with a copolymer according to the present invention, the copolymer has a biphenyl group or a naphthyl group at the end of a side chain and hence tends to adsorb on pigment surface to thereby provide a dispersion that is stable and has high dispersibility.

The composition ratio of the repeating units represented by the chemical formulae 1 and 2 that make up a copolymer according to the present invention preferably satisfies, from the viewpoint of the capability of adsorbing pigment, chemical formulae 1:2=1:1 to 10:1, more preferably 1:1 to 5:1, still more preferably 1:1 to 3:1.

The composition ratio of the repeating units represented by the chemical formulae 1 to 3 that make up a copolymer according to the present invention preferably satisfies, from the viewpoint of the capability of adsorbing pigment, in the case of chemical formulae 1:2=1:1 to 10:1, chemical formulae 1 and 2 (total amount): chemical formula 3=0.5:1 to 30:1, more preferably 1:1 to 10:1.

A copolymer according to the present invention preferably has a number-average molecular weight of 500 to 10,000 and a weight-average molecular weight of 1500 to 30000 in terms of polystyrene.

A copolymer according to the present invention may include, in addition to the repeating units represented by the chemical formulae 1 to 3, a repeating unit derived from another polymerizable monomer.

Such another polymerizable monomer is not particularly limited and may be appropriately selected in accordance with the purpose: for example, a polymerizable hydrophobic monomer, a polymerizable hydrophilic monomer, or a polymerizable surfactant.

Examples of the polymerizable hydrophobic monomer include unsaturated ethylene monomers having aromatic rings such as α-methyl styrene, 4-t-butyl styrene, and 4-chloromethyl styrene; alkyl(meth)acrylates such as methyl(meth)acrylate, ethyl(meth)acrylate, n-butyl(meth)acrylate, dimethyl maleate, dimethyl itaconate, dimethyl fumarate, lauryl (meth)acrylate (C12), tridecyl(meth)acrylate (C13), tetradecyl(meth)acrylate (C14), pentadecyl(meth)acrylate (C15), hexadecyl(meth)acrylate (C16), heptadecyl(meth) acrylate (C17), nonadecyl(meth)acrylate (C19), eicosyl (meth)acrylate (C20), henicosyl(meth)acrylate (C21), and docosyl(meth)acrylate (C22); and unsaturated ethylene monomers having alkyl groups such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-dimethyl-1-hexene, 1-nonene, 3,5,5-trimethyl-1-hexene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, and 1-docosene. These monomers may be used alone or in combination of two or more thereof.

Examples of the polymerizable hydrophilic monomer include anionic unsaturated ethylene monomers such as (meth)acrylic acid or salts thereof, maleic acid or salts thereof, monomethyl maleate, itaconic acid, monomethyl itaconate, fumaric acid, 4-styrenesulfonic acid, and 2-acrylamide-2-methylpropanesulfonic acid; and nonionic unsaturated ethylene monomers such as 2-hydroxyethyl(meth)acrylate, diethylene glycol mono(meth)acrylate, triethylene glycol mono(meth)acrylate, tetraethylene glycol mono (meth)acrylate, polyethylene glycol mono(meth)acrylate, (meth)acrylamide, N-methylol(meth)acrylamide, N-vinylformamide, N-vinylacetamide, N-vinylpyrrolidone, acrylamide, N,N-dimethylacrylamide, N-t-butylacrylamide, N-octylacrylamide, and N-t-octylacrylamide.

One or more selected from such polymerizable hydrophobic monomers and polymerizable hydrophilic monomers may be used in an amount of 5% to 100% by weight relative to the total amount of the monomers forming the repeating units represented by the chemical formulae 1 to 3.

The polymerizable surfactant is an anionic or nonionic surfactant intramolecularly having at least one radical-polymerizable unsaturated-double-bond group.

Examples of the anionic surfactant include a hydrocarbon compound having a sulfate group such as an ammonium sulfate group ($-SO_3^-NH_4^+$) and an allyl group ($-CH_2-CH=CH_2$); a hydrocarbon compound having a sulfate group such as an ammonium sulfate group ($-SO_3^-NH_4^+$) and a methacrylic group [$-CO-C(CH_3)=CH_2$]; and an aromatic hydrocarbon compound having a sulfate group such as an ammonium sulfate group ($-SO_3^-NH_4^+$) and a 1-propenyl group ($-CH=CH_2CH_3$). Specific examples of the anionic surfactant include ELEMINOL JS-20 and RS-300 (manufactured by Sanyo Chemical Industries, Ltd.); and AQUALON KH-10, AQUALON KH-1025, AQUALON KH-05, AQUALON HS-10, AQUALON HS-1025, AQUALON BC-0515, AQUALON BC-10, AQUALON BC-1025, AQUALON BC-20, and AQUALON BC-2020 (manufactured by DAI-ICHI KOGYO SEIYAKU CO., LTD.).

The nonionic surfactant may be a hydrocarbon compound or aromatic hydrocarbon compound having a 1-propenyl group ($-CH=CH_2CH_3$) and a polyoxyethylene group [$-(C_2H_4O)n-H$]. Specific examples of the nonionic surfactant include AQUALON RN-20, AQUALON RN-2025, AQUALON RN-30, and AQUALON RN-50 (manufactured by DAI-ICHI KOGYO SEIYAKU CO., LTD.); and LATEMUL PD-104, LATEMUL PD-420, LATEMUL PD-430, and LATEMUL PD-450 (manufactured by Kao Corporation).

One or more of such polymerizable surfactants may be used in an amount of 0.1% to 10% by weight relative to the monomers forming the repeating units represented by the chemical formulae 1 to 3.

A copolymer according to the present invention can be synthesized by, for example, a synthesis method 1 or a synthesis method 2 below.

Synthesis Method 1

As illustrated with the following formulae, naphthalenecarbonyl chloride (A-1) and an excess of a diol compound are subjected to a condensation reaction in the presence of an acid receiver such as an amine or pyridine to provide a hydroxyalkyl naphthalenecarboxylate (A-2). A styrene-maleic anhydride copolymer (A-3) and an excess of (A-2) above are then subjected to an addition reaction to provide a copolymer (A-4) according to the present disclosure.

subsequently copolymerized in the presence of a radical polymerization initiator to provide a copolymer (A-4) according to the present disclosure.

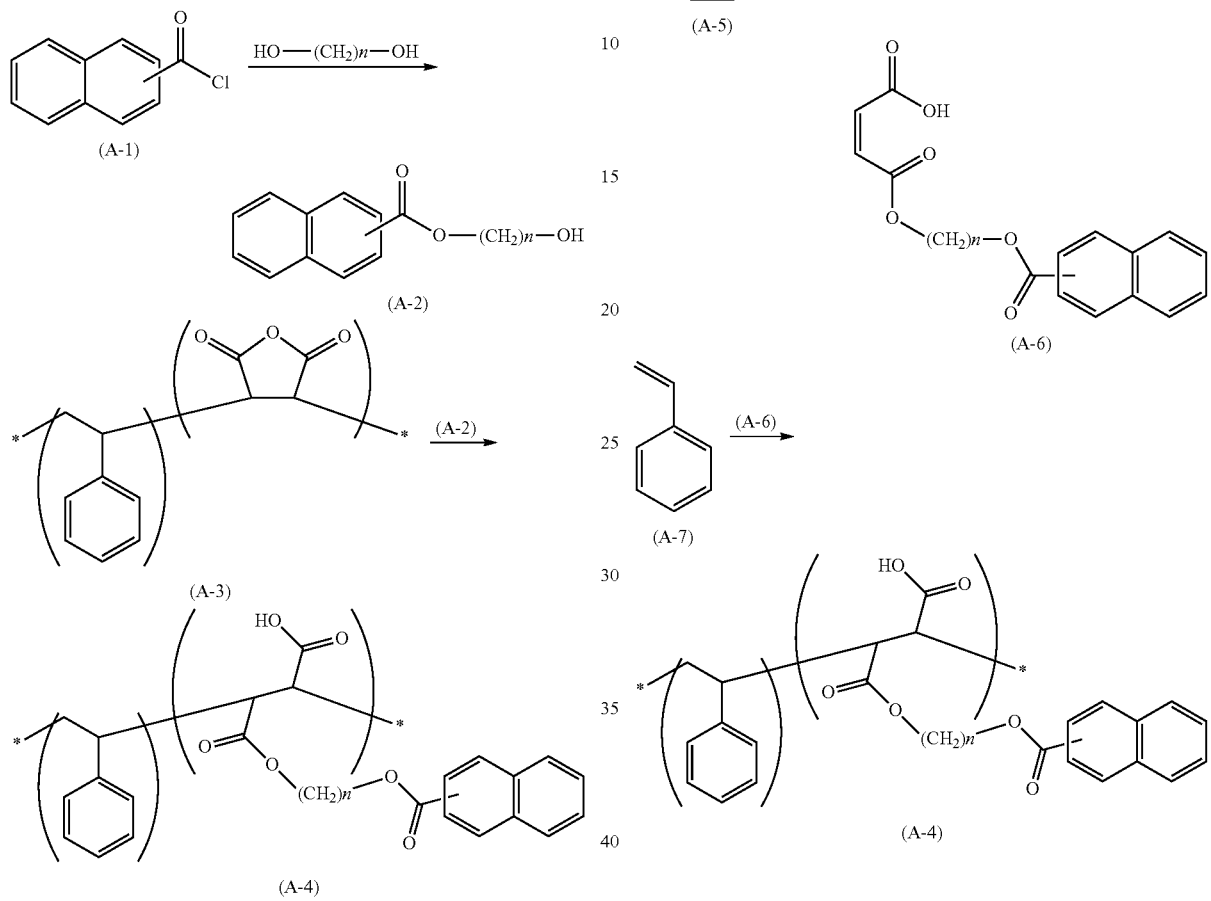

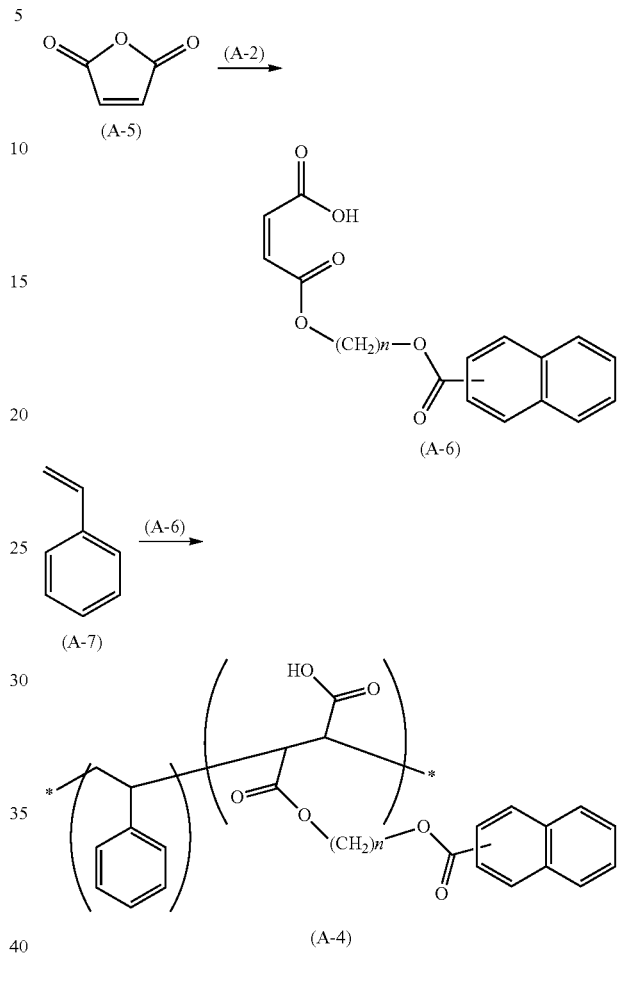

Synthesis Method 2

As illustrated with the following formulae, a reaction between maleic anhydride (A-5) and a hydroxyalkyl naphthalenecarboxylate (A-2) is caused to provide a maleic acid half-ester monomer (A-6). This (A-6) and styrene (A-7) are Synthesis Method 3

As in the synthesis method 2, the maleic acid half-ester monomer (A-6) is synthesized. As illustrated with the following formula, this (A-6), styrene (A-7), and methyl methacrylate (A-8) are copolymerized in the presence of a radical polymerization initiator to provide a copolymer (A-9) according to the present disclosure.

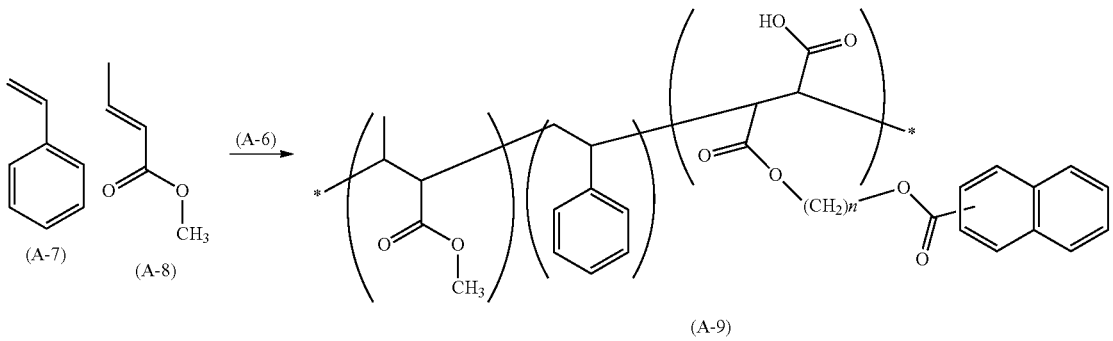

The above-described radical polymerization initiator is not particularly limited and can be appropriately selected in accordance with the purpose. Examples of the radical polymerization initiator include peroxy ketal, hydroperoxide, dialkyl peroxide, diacyl peroxide, peroxydicarbonate, peroxy ester, cyano initiators that are azobisisobutyronitrile, azobis(2-methylbutyronitrile), and azobis(2,2'-isovaleronitrile), and a non-cyano initiator that is dimethyl-2,2'-azobisisobutyrate. Of these, because molecular-weight control is easily achieved and the decomposition temperature is low, organic peroxides and azo compounds are preferred; and, in particular, azo compounds are preferred.

The content of the radical polymerization initiator is not particularly limited and can be appropriately selected in accordance with the purpose. The content of the radical polymerization initiator is preferably 1% to 10% by mass relative to the total amount of the polymerizable monomers.

For the purpose of adjusting the molecular weight of the polymer, a chain transfer agent may be added in an appropriate amount.

Examples of the chain transfer agent include mercaptoacetic acid, mercaptopropionic acid, 2-propanethiol, 2-mercaptoethanol, thiophenol, dodecylmercaptan, 1-dodecanethiol, and thioglycerol.

The polymerization temperature is not particularly limited and can be appropriately selected in accordance with the purpose. The polymerization temperature is preferably 50° C. to 150° C., more preferably 60° C. to 100° C. The polymerization time is also not particularly limited and can be appropriately selected in accordance with the purpose. The polymerization time is preferably 3 to 48 hours.

Non-limiting specific examples of a copolymer according to the present disclosure include the following compounds. In the formulae, "n" represents an integer of 2 to 18; "m" represents 0 or 1; and "k" represents 1 to 22.

SPECIFIC EXAMPLE 1

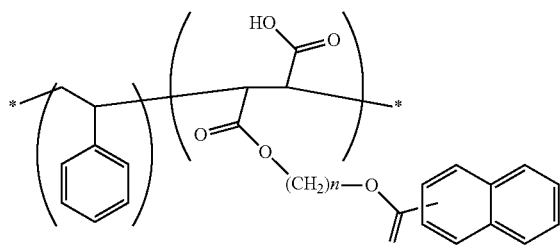

SPECIFIC EXAMPLE 2

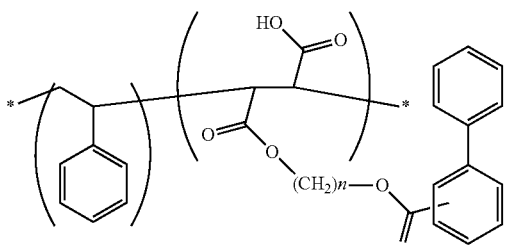

SPECIFIC EXAMPLE 3

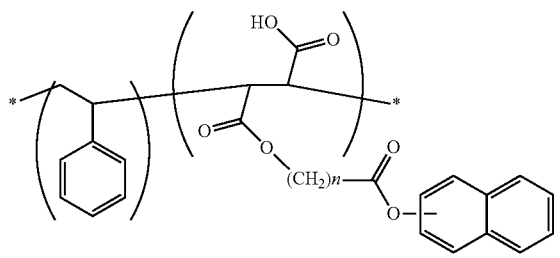

SPECIFIC EXAMPLE 4

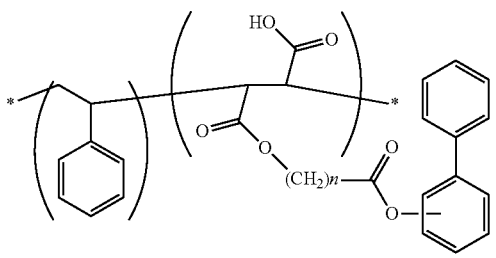

SPECIFIC EXAMPLE 5

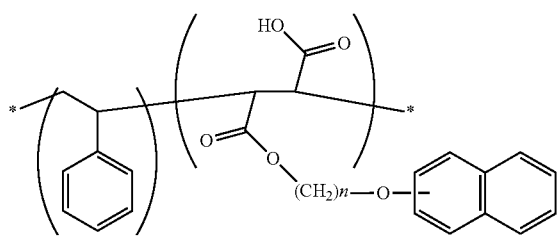

SPECIFIC EXAMPLE 6

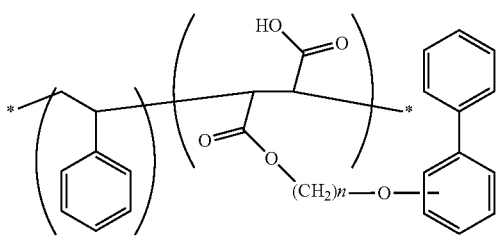

SPECIFIC EXAMPLE 7

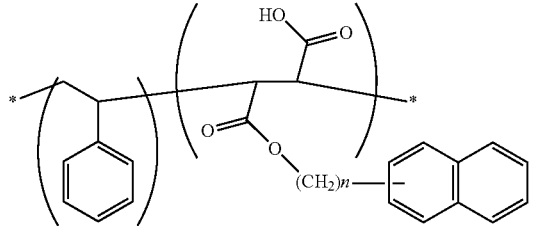

SPECIFIC EXAMPLE 8

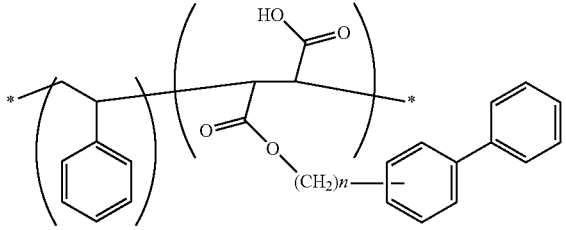

-continued
SPECIFIC EXAMPLE 9
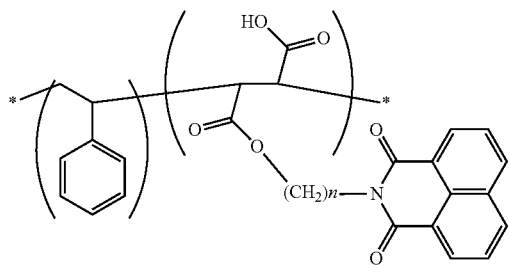
SPECIFIC EXAMPLE 10
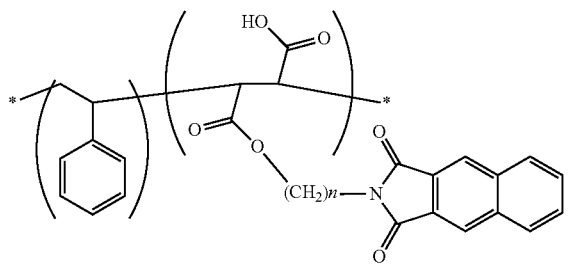
SPECIFIC EXAMPLE 11
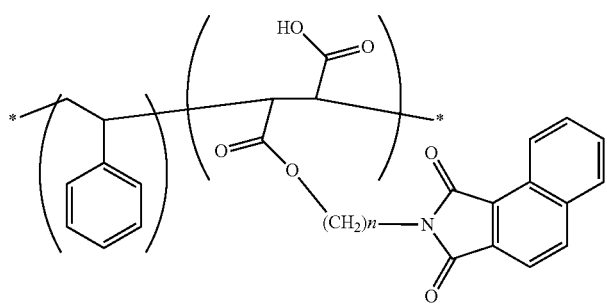
SPECIFIC EXAMPLE 12
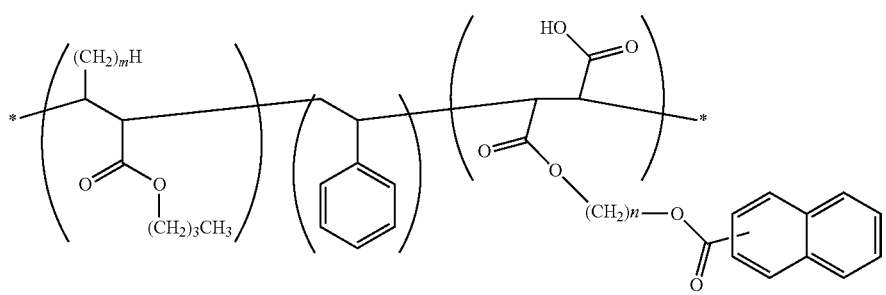
SPECIFIC EXAMPLE 13
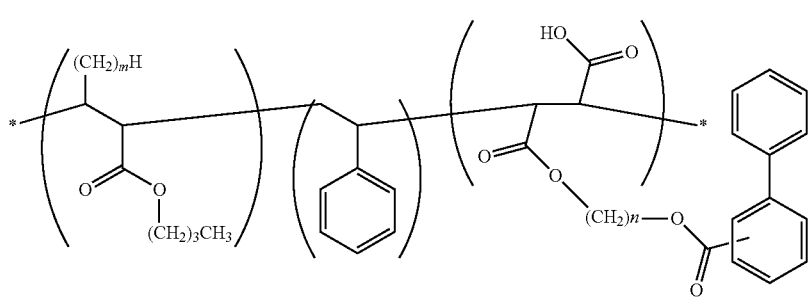
SPECIFIC EXAMPLE 14
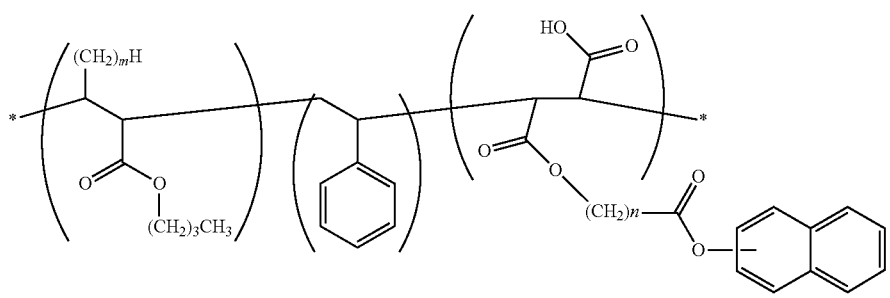

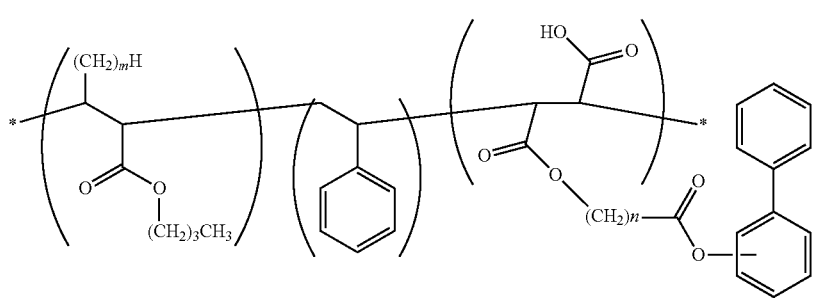
SPECIFIC EXAMPLE 15
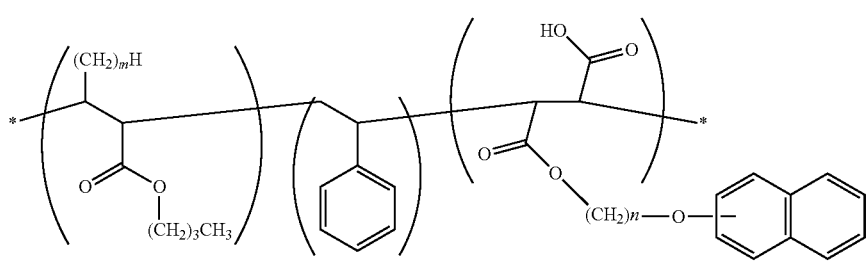
SPECIFIC EXAMPLE 16
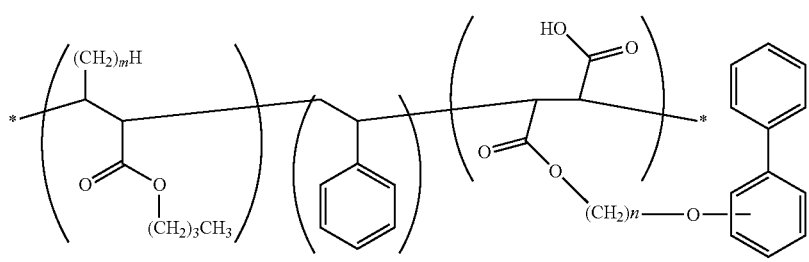
SPECIFIC EXAMPLE 17
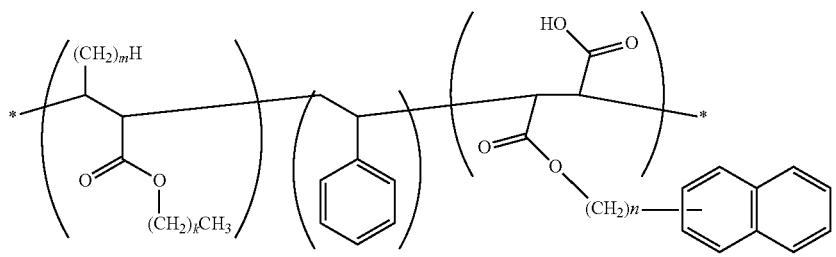
SPECIFIC EXAMPLE 18
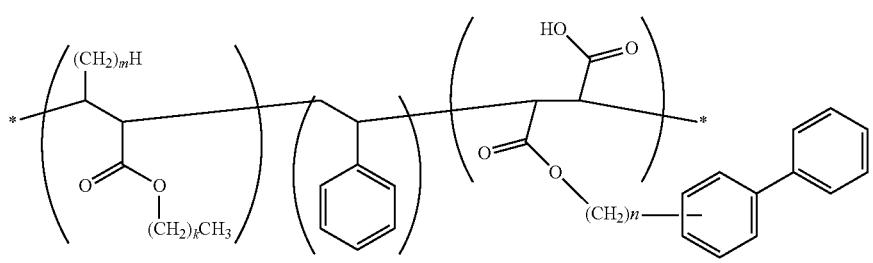
SPECIFIC EXAMPLE 19
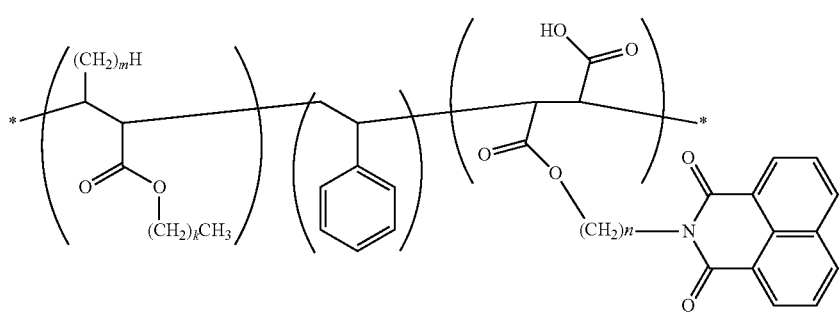
SPECIFIC EXAMPLE 20

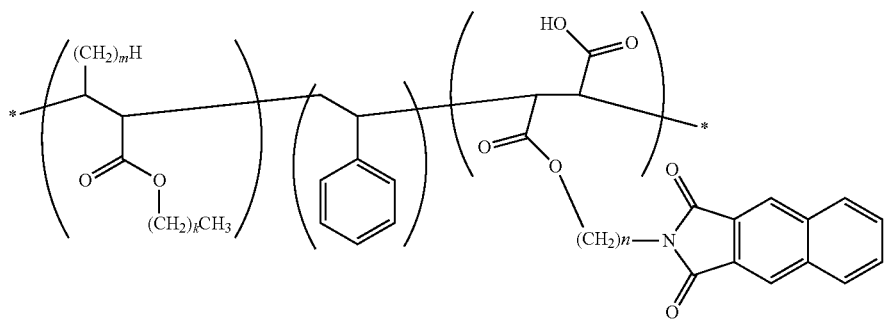

SPECIFIC EXAMPLE 21

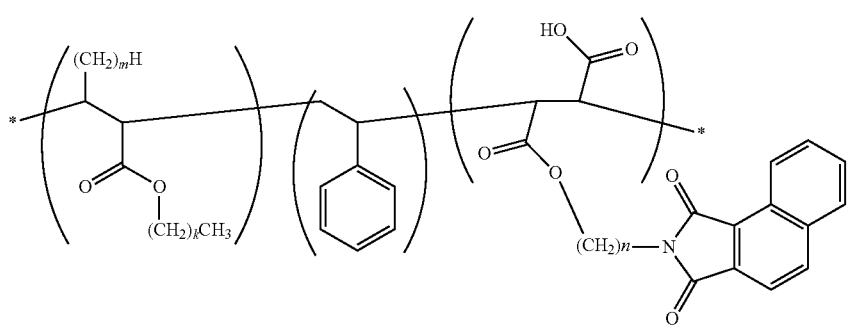

SPECIFIC EXAMPLE 22

A colorant of an aqueous ink according to the present disclosure may be pigment or dye. The above-described copolymer has a higher capability of colorant adsorption to pigment than to dye; and, from the viewpoint of water resistance and light resistance, pigment is preferred.

The pigment is not particularly limited and can be appropriately selected in accordance with the purpose. Examples of the pigment include inorganic and organic pigments for black color and other colors. These pigments may be used alone or in combination of two or more thereof.

Examples of the inorganic pigments include titanium oxide, iron oxide, calcium carbonate, barium sulfate, aluminum hydroxide, barium yellow, cadmium red, chromium yellow, and carbon black produced by a publicly known method such as a contact process, a furnace process, or a thermal process.

Examples of the pigment for black color include carbon blacks (C.I. Pigment Black 7) such as furnace black, lamp black, acetylene black, and channel black; metals such as copper and iron (C.I. Pigment Black 11); metal oxides such as titanium oxide; and organic pigments such as aniline black (C.I. Pigment Black 1).

The above-described carbon black is preferably a carbon black that is produced by a furnace process or a channel process, has a primary particle size of 15 to 40 nm, a BET specific surface area of 50 to 300 $m^2/g$, a DBP oil absorption number of 40 to 150 mL/100 g, a volatile content of 0.5% to 10%, and a pH of 2 to 9.

Examples of the organic pigments include azo pigments (including, for example, azo lake, insoluble azo pigments, condensation azo pigments, and chelate azo pigments), polycyclic pigments (for example, phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (for example, basic dye chelates and acidic dye chelates), nitro pigments, nitroso pigments, and aniline black.

Of these pigments, in particular, pigments having a high affinity for water are preferably used.

Such azo pigments include, for example, azo lake, insoluble azo pigments, condensation azo pigments, and chelate azo pigments.

Such polycyclic pigments include, for example, phthalocyanine pigments, perylene pigments, perinone pigments, anthraquinone pigments, quinacridone pigments, dioxazine pigments, indigo pigments, thioindigo pigments, isoindolinone pigments, quinophthalone pigments, and rhodamine B lake pigments.

Such dye chelates include, for example, basic dye chelates and acidic dye chelates.

The pigment for yellow is not particularly limited and can be appropriately selected in accordance with the purpose. Examples of the pigment include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 174, and C.I. Pigment Yellow 180.

The pigment for magenta is not particularly limited and can be appropriately selected in accordance with the purpose. Examples of the pigment include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 176, CA. Pigment Red 184, C.I. Pigment Red 185, C.I. Pigment Red 202, and Pigment Violet 19.

The pigment for cyan is not particularly limited and can be appropriately selected in accordance with the purpose. Examples of the pigment include C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Pigment Blue 63, C.I. Pigment Blue 66; C.I. Vat Blue 4, and C.I. Vat Blue 60.

Use of C.I. Pigment Yellow 74 as a yellow pigment, C.I. Pigment Red 122 and C.I. Pigment Violet 19 as magenta pigments, and C.I. Pigment Blue 15:3 as a cyan pigment can provide well-balanced inks excellent in terms of tone and light resistance.

An ink according to the present disclosure may include a pigment that is newly produced for the present disclosure.

From the viewpoint of color development of images to be provided, a self-dispersible pigment may be used and an anionic self-dispersible pigment is preferably used. The anionic self-dispersible pigment denotes a pigment in which an anionic functional group is introduced to the pigment surface directly or via another atomic group so that dispersion stabilization is achieved.

Examples of such a pigment to be treated for dispersion stabilization include various publicly known pigments as listed in WO 2009/014242.

The anionic functional group denotes a functional group in which half or more of hydrogen ions dissociate at a pH of 7.0. Specific examples of the anionic functional group include a carboxyl group, a sulfo group, and a phosphonic group. Of these, from the viewpoint of increasing the optical density of images to be provided, a carboxyl group or a phosphonic group is preferred.

The method of introducing an anionic functional group to pigment surface is, for example, a method of subjecting carbon black to an oxidization treatment.

Specific examples of the oxidization treatment method include treatment methods with a hypochlorite, ozone water, hydrogen peroxide, a chlorite, nitric acid, or the like; and surface treatment methods using diazonium salts described in JP-3808504-B1 (JP-H10-510861-A), JP-2009-515007-A, and JP-2009-506196-A.

Examples of commercially available pigments having a surface hydrophilic functional group include CW-1, CW-2, and CW-3 (these are manufactured by ORIENT CHEMICAL INDUSTRIES CO., LTD.); and CAB-O-JET200, CAB-O-JET300, and CAB-O-JET400 (manufactured by Cabot Corporation).

The pigment content in the aqueous ink is not particularly limited and can be appropriately selected in accordance with the purpose. The pigment content is preferably 0.5% to 20% by mass, more preferably 1% to 10% by mass.

The above-described dye can be selected from dyes classified as acid dyes, direct dyes, basic dyes, reactive dyes, and food dyes in the Colour Index.

Specifically, for example, the acid dyes and food dyes include C.I. Acid Black 1, 2, 7, 24, 26, and 94, C.I. Acid Yellow 17, 23, 42, 44, 79, and 142, C.I. Acid Blue 9, 29, 45, 92, and 249, C.I. Acid Red 1, 8, 13, 14, 18, 26, 27, 35, 37, 42, 52, 82, 87, 89, 92, 97, 106, 111, 114, 115, 134, 186, 249, 254, and 289, C.I. Food Black 1 and 2, C.I. Food Yellow 3 and 4, and C.I. Food Red 7, 9, and 14; the direct dyes include C.I. Direct Black 19, 22, 32, 38, 51, 56, 71, 74, 75, 77, 154, (168), and 171, C.I. Direct Yellow 1, 12, 24, 26, 33, 44, 50, 86, 120, 132, 142, and 144, C.I. Direct Blue 1, 2, 6, 15, 22, 25, 71, 76, 79, 86, 87, 90, 98, 163, 165, 199, and 202, C.I. Direct Red 1, 4, 9, 13, 17, 20, 28, 31, 39, 80, 81, 83, 89, 225, and 227, and C.I. Direct Orange 26, 29, 62, and 102; the basic dyes include C.I. Basic Black 2 and 8, C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, and 91, C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155, and C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112; and the reactive dyes include C.I. Reactive Black 3, 4, 7, 11, 12, and 17, C.I. Reactive Yellow 1, 5, 11, 13, 14, 20, 21, 22, 25, 40, 47, 51, 55, 65, and 67, C.I. Reactive Blue 1, 2, 7, 14, 15, 23, 32, 35, 38, 41, 63, 80, and 95, and C.I. Reactive Red 1, 14, 17, 25, 26, 32, 37, 44, 46, 55, 60, 66, 74, 79, 96, and 97.

An aqueous ink according to the present disclosure preferably includes a water-soluble organic solvent so that the penetrability of the aqueous ink into conventional paper sheets, coated paper sheets, and the like is enhanced to further suppress the occurrence of beading, and the wetting effect is utilized to prevent the ink from drying.

The water-soluble organic solvent is not particularly limited. Examples of the water-soluble organic solvent include polyhydric alcohols such as ethylene glycol, diethylene glycol, triethylene glycol, tetraethylene glycol, polyethylene glycol, propylene glycol, dipropylene glycol, tripropylene glycol, polypropylene glycol, 1,3-butanediol, 3-methyl-1,3-butanediol, trimethylolethane, trimethylolpropane, 1,5-pentanediol, 1,6-hexanediol, hexylene glycol, glycerin, 1,2,3-butanetriol, 1,2,4-butanetriol, 1,2,6-hexanetriol, isopropylidene glycerol, and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone; amides such as formamide, N-methylformamide, N,N-dimethylformamide, N,N-dimethyl-β-methoxypropionamide, and N,N-dimethyl-β-butoxypropionamide; amines such as monoethanolamine, diethanolamine, triethanolamine, monoethylamine, diethylamine, and triethylamine; sulfur-containing compounds such as dimethyl sulfoxide, sulfolane, and thiodiethanol; 3-ethyl-3-hydroxymethyloxetane, propylene carbonate, and ethylene carbonate. These solvents may be used alone or in combination of two or more thereof.

Of these, from the viewpoint of suppression of curling of conventional paper sheets, preferred are 3-ethyl-3-hydroxymethyloxetane, isopropylidene glycerol, N,N-dimethyl-β-methoxypropionamide, and N,N-dimethyl-β-butoxypropionamide.

Diethylene glycol, triethylene glycol, 1,3-butanediol, 2,2,4-trimethyl-1,3-pentanediol, and glycerin are excellent in terms of suppression of discharge failure caused by evaporation of water.

Examples of a water-soluble organic solvent that has relatively low wettability and has penetrability include 2-ethyl-1,3-hexanediol [solubility: 4.2% (25° C.)] and 2,2,4-trimethyl-1,3-pentanediol [solubility: 2.0% (25° C.)].

Other examples of the water-soluble organic solvent include aliphatic diols such as 2-ethyl-2-methyl-1,3-propanediol, 2,2-diethyl-1,3-propanediol, 2-methyl-2-propyl-1,3-propanediol, 3,3-dimethyl-1,2-butanediol, 2,4-dimethyl-2,4-pentanediol, 2,5-dimethyl-2,5-hexanediol, and 5-hexene-1,2-diol.

Another water-soluble organic solvent that can be used in combination with the above-described water-soluble organic solvent can be appropriately selected in accordance with the purpose from alkyl or aryl ethers of polyhydric alcohols such as diethylene glycol monobutyl ether, propylene glycol monobutyl ether, ethylene glycol monophenyl ether, diethylene glycol monophenyl ether, ethylene glycol monoallyl ether, and tetraethylene glycol chlorophenyl ether; and lower alcohols such as ethanol.

An aqueous ink according to the present disclosure preferably includes a surfactant so that the penetrability and wettability of the aqueous ink to conventional paper sheets, coated paper sheets, and the like are enhanced and the occurrence of beading is suppressed.

Examples of the surfactant include fluorine-based surfactants, silicone-based surfactants, anionic surfactants, nonionic surfactants, and betaine-based surfactants. These surfactants may be used alone or as a mixture of two or more thereof. Of these, fluorine-based surfactants and silicone-based surfactants are preferred because the surface tension can be decreased to 30 mN/nm or less.

Examples of the fluorine-based surfactants include nonionic fluorine-based surfactants, anionic fluorine-based surfactants, amphoteric fluorine-based surfactants, and oligomer fluorine-based surfactants. In such a fluorine-based surfactant, the number of carbon atoms replaced by fluorine atoms is preferably 2 to 16, more preferably 4 to 16. When this number of carbon atoms is less than 2, the specific effect of fluorine-based surfactants is not provided in some cases; and when this number of carbon atoms is more than 16, problems in terms of storability and the like may be caused.

Examples of the nonionic fluorine-based surfactants include perfluoroalkyl phosphoric ester compounds, perfluoroalkyl ethylene oxide adducts, and polyoxyalkylene ether polymer compounds having perfluoroalkyl ether groups as side chains. Of these, preferred are polyoxyalkylene ether polymer compounds having perfluoroalkyl ether groups as side chains because of low foamability; and more preferred are fluorine-based surfactants represented by the following chemical formula (α).

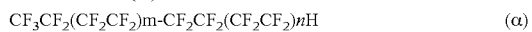

(where m represents 0 to 10 and n represents 0 to 40)

Examples of the anionic fluorine-based surfactants include perfluoroalkyl sulfonic acid compounds, perfluoroalkyl carboxylic acid compounds, perfluoroalkyl phosphoric ester compounds, and polyoxyalkylene ether polymer compounds having perfluoroalkyl ether groups as side chains.

Examples of the perfluoroalkyl sulfonic acid compounds include perfluoroalkyl sulfonic acids and perfluoroalkyl sulfonic acid salts.

Examples of the perfluoroalkyl carboxylic acid compounds include perfluoroalkyl carboxylic acids and perfluoroalkyl carboxylic acid salts.

Examples of the perfluoroalkyl phosphoric ester compounds include perfluoroalkyl phosphoric esters and perfluoroalkyl phosphoric ester salts.

Examples of the polyoxyalkylene ether polymer compounds having perfluoroalkyl ether groups as side chains include polyoxyalkylene ether polymers having perfluoroalkyl ether groups as side chains, sulfates of polyoxyalkylene ether polymers having perfluoroalkyl ether groups as side chains, and salts of polyoxyalkylene ether polymers having perfluoroalkyl ether groups as side chains.

Examples of counter ions of salts in such fluorine-based surfactants include Li, Na, K, $NH_4$, $NH_3CH_2CH_2OH$, $NH_2(CH_2CH_2OH)_2$, and $NH(CH_2CH_2OH)_3$.

Examples of commercially available fluorine-based surfactants include SURFLON S-111, S-112, S-113, S-121, S-131, S-132, S-141, and S-145 (these are manufactured by Asahi Glass Co., Ltd.); Fluorad FC-93, FC-95, FC-98, FC-129, FC-135, FC-170C, FC-430, and FC-431 (these are manufactured by Sumitomo 3M Limited); MEGAFACE F-470, F-1405, and F-474 (these are manufactured by Dainippon Ink and Chemicals); Zonyl TBS, FSP, FSA, FSN-100, FSN, FSO-100, FSO, FS-300, and UR (these are manufactured by E. I. du Pont de Nemours and Company); FTERGENT FT-110, FT-250, FT-251, FT-400S, FT-150, and FT-400SW (these are manufactured by NEOS COMPANY LIMITED), and PolyFox PF-136A, PF-156A, PF-15 IN, PF-154, and PF-159 (these are manufactured by OMNOVA Solutions Inc.).

Of these, in particular, preferred are FS-300 (manufactured by E. I. du Pont de Nemours and Company), FT-110, FT-250, FT-251, FT-400S, FT-150, and FT-400SW (manufactured by NEOS COMPANY LIMITED), and PolyFox PF-151N (manufactured by OMNOVA Solutions Inc.) because good printing quality is achieved and, in particular, color development and level dyeing capability for paper sheets are considerably enhanced.

The silicone-based surfactants are not particularly limited and can be appropriately selected in accordance with the purpose. Examples of the silicone-based surfactants include side-chain-modified polydimethylsiloxanes, both-end-modified polydimethylsiloxanes, single-end-modified polydimethylsiloxanes, and side-chain- and both-end-modified polydimethylsiloxanes. In particular, preferred are polyether-modification silicone-based surfactants having a polyoxyethylene group or a polyoxyethylene-polyoxypropylene group as a modification group because the surfactants exhibit good properties as aqueous surfactants.

Commercial silicone-based surfactants are easily available from, for example, BYK Japan KK, Shin-Etsu Chemical Co., Ltd., Dow Corning Toray Silicone Co., Ltd., NIHON EMULSION Co., Ltd., or Kyoeisha Chemical Co., Ltd.

Examples of the anionic surfactants include polyoxyethylene alkyl ether acetates, dodecylbenzenesulfonates, laurates, and polyoxyethylene alkyl ether sulfate salts.

Examples of the nonionic surfactants include polyoxyethylene alkyl ethers, polyoxypropylene alkyl ethers, polyoxyethylene alkyl esters, polyoxyethylene sorbitan fatty acid esters, polyoxyethylene alkyl phenyl ethers, polyoxyethylene alkyl amines, and polyoxyethylene alkyl amides.

If necessary, an aqueous ink according to the present disclosure may appropriately include another component such as a pH adjusting agent, an antiseptic fungicide, an anticorrosive, an antioxidant, an UV absorber, an oxygen absorbent, or a light stabilizer.

The pH adjusting agent is not particularly limited and can be appropriately selected in accordance with the purpose as long as it allows adjustment of pH to 8.5 to 11 without adversely affecting the prepared ink. Examples of the pH adjusting agent include alcohol amines, hydroxides of alkali metal elements, hydroxides of ammonium, phosphonium hydroxides, and carbonates of alkali metals. Examples of the alcohol amines include diethanolamine, triethanolamine, and 2-amino-2-ethyl-1,3-propanediol. Examples of the hydroxides of alkali metal elements include lithium hydroxide, sodium hydroxide, and potassium hydroxide. Examples of the hydroxides of ammonium include ammonium hydroxide and quaternary ammonium hydroxide. Examples of the phosphonium hydroxides include quaternary phosphonium hydroxide. Examples of the carbonates of alkali metals include lithium carbonate, sodium carbonate, and potassium carbonate.

Examples of the antiseptic fungicide include sodium dehydroacetate, sodium sorbate, 2-pyridinethiol-1-oxide sodium, sodium benzoate, and pentachlorophenol sodium.

Examples of the anticorrosive include acid sulfite, sodium thiosulfate, ammonium thiodiglycolate, diisopropylammonium nitrite, pentaerythritol tetranitrate, and dicyclohexylammonium nitrite.

Examples of the antioxidant include phenol-based antioxidants (including hindered phenol-based antioxidants), amine-based antioxidants, sulfur-based antioxidants, and phosphorus-based antioxidants.

Examples of the UV absorber include benzophenone-based UV absorbers, benzotriazole-based UV absorbers, salicylate-based UV absorbers, cyanoacrylate UV absorbers, and nickel-complex-salt-based UV absorbers.

An aqueous ink according to the present disclosure can be produced by, for example, dispersing or dissolving, in an aqueous medium, water, a water-soluble organic solvent, a pigment, the above-described copolymer, and optionally another component and by stirring and mixing the solution. The copolymer may be used as a pigment dispersion resin during preparation of a pigment dispersion.

The dispersing can be performed with, for example, a sand mill, a homogenizer, a ball mill, a paint shaker, or an ultrasonic dispersion apparatus. The stirring and mixing can be performed with, for example, a stirrer having a normal impeller, a magnetic stirrer, or a high-speed dispersion apparatus.

During the production, coarse particles are optionally filtered off with a filter, a centrifuge, or the like and degassing is preferably performed.

Properties of an aqueous ink according to the present disclosure are not particularly limited and can be appropriately selected in accordance with the purpose. For example, the viscosity and the surface tension of the aqueous ink are preferably within the following ranges.

The viscosity of the aqueous ink at 25° C. is preferably 3 to 20 mPa·s. When the viscosity is 3 mPa·s or more, the effects of increasing the printing density and improving character quality are provided. When the viscosity is 20 mPa·s or less, ink dischargeability can be ensured.

The viscosity can be measured with, for example, a viscometer (RL-550, manufactured by Toki Sangyo Co., Ltd.) at 25° C.

The surface tension of the aqueous ink at 25° C. is preferably 40 mN/m or less.

An ink cartridge according to the present disclosure contains the above-described aqueous ink in a container and optionally includes another member that is appropriately selected.

The container is not particularly limited. For example, the shape, structure, size, or material of the container can be appropriately selected in accordance with the purpose. For example, the container preferably includes at least an ink bag formed of an aluminum laminate film, a resin film, or the like.

Figure 13:
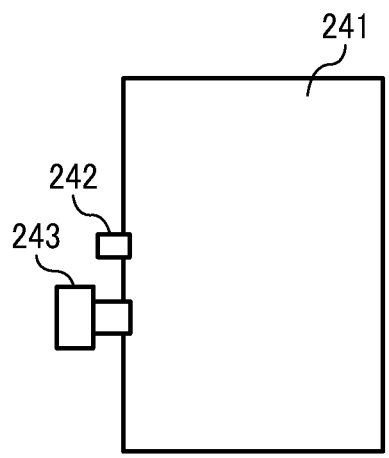
FIG. 13 is a schematic view illustrating an example of the ink cartridge according to an embodiment of the present invention.
Figure 14:
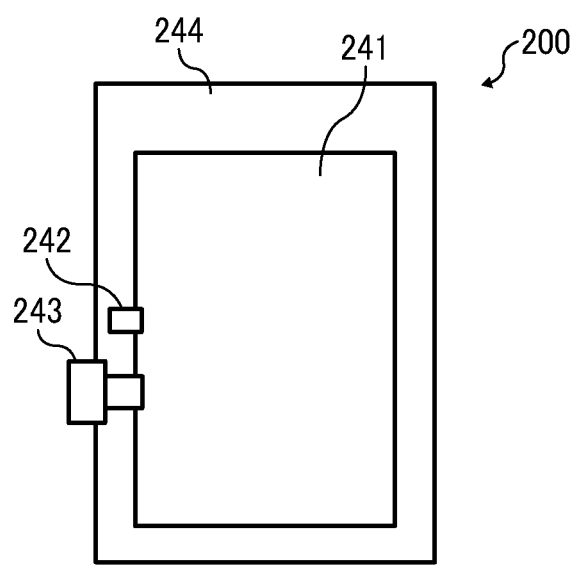
FIG. 14 is a schematic view illustrating an example of the in k cartridge of FIG. 13 and its housing.

The ink cartridge will be described with reference to FIGS. 13 and 14. FIG. 13 illustrates an example of the ink cartridge. FIG. 14 illustrates the ink cartridge in FIG. 13 and its case (casing). In an ink cartridge 200, ink is charged through an ink inlet 242 into an ink bag 241; the gas is vented from the ink bag 241; and the ink inlet 242 is then sealed by fusion. At the time of use, a needle in the apparatus body is inserted through an ink outlet 243 formed of a rubber member to allow supply to the apparatus. The ink bag 241 is formed of a package member such as a gas-impermeable aluminum laminate film. As illustrated in FIG. 14, in general, this ink bag 241 is contained in a cartridge case 244 formed of plastic and is used in the state of being detachably attached to various inkjet recording apparatuses.

EXAMPLES

Hereinafter, the present disclosure will be specifically described further with reference to Examples. However, the present disclosure is not limited to these Examples. In the Examples, "parts" and "%" denote "parts by weight" and "% by weight" unless otherwise specified.

The molecular weight of the copolymers obtained in Examples and Comparative Examples were obtained as follows:

Measuring of Molecular Weight of Copolymer

The molecular weight was measured by a gel permeation chromatography (GPC) under the following condition:

Measuring instrument: GPC-8020 (manufactured by Tosoh Corporation)

Column: TSK G2000 HXL and G4000 HXL (manufactured by Tosoh Corporation)

Temperature: 40° C.

Solvent: tetrahydrofuram (THF)

Flow speed: 1.0 mL/minute 1 mL of a copolymer having a concentration of 0.5% by weight was poured to the column and the number average molecular weight Mn and the weight average molecular weight Mw of the measured copolymer were calculated using the molecular weight calibration curve prepared by a simple dispersion polystyrene sample.

Example 1

Ethylene glycol (15.6 g, 252 mmol) was dissolved in 100 mL of methylene chloride. To this solution, 3.49 g (44 mmol) of pyridine was added and the solution was cooled with ice water. To this solution being stirred, a solution containing 8.00 g (42 mmol) of 2-naphthalenecarbonyl chloride dissolved in 80 mL of methylene chloride was dropped over an hour. This solution was stirred for 2 hours and subsequently further stirred at room temperature for 6 hours. The resultant reaction solution was rinsed with water; the organic phase was then separated and dried over magnesium sulfate, and the solvent was distilled off. The residue was purified by silica gel column chromatography with a methylene chloride/methanol (97/3) solvent mixture serving as an eluent to provide 6.88 g of 2-naphthoic acid 2-hydroxyethyl ester.

Subsequently, 0.2 g of a styrene-maleic anhydride copolymer [SMA1000P, manufactured by KAWAHARA PETROCHEMICAL CO., LTD., weight-average molecular weight (Mw): 5500, number-average molecular weight (Mn): 2000] and 0.64 g (3 mmol) of 2-naphthoic acid 2-hydroxyethyl ester were dissolved in 8 mL of dried dimethylformamide and stirred at 120° C. for 12 hours. The resultant reaction solution was diluted with toluene and the solvent was distilled off. The residue was purified with a recycling HPLC (LC-9201, manufactured by Japan Analytical Industry Co., Ltd., developing solvent: tetrahydrofuran, flow rate: 3.5 mL/min) to provide 0.17 g of Copolymer 1 having a weight molecular weight (Mw) of 5,700 and a number of molecular weight (Mn) of 2,200.

The infrared absorption spectrum (KBr pellet method) of Copolymer 1 is illustrated in FIG. 1.

Example 2

As in Example 1, 2-naphthoic acid 4-hydroxybutyl ester was obtained except that ethylene glycol was replaced by 1,4-butanediol.

Subsequently, in the same manner as in Example 1, Copolymer 2 having a weight molecular weight (Mw) of 5,700 and a number of molecular weight (Mn) of 2,200. was obtained.

Figure 2:
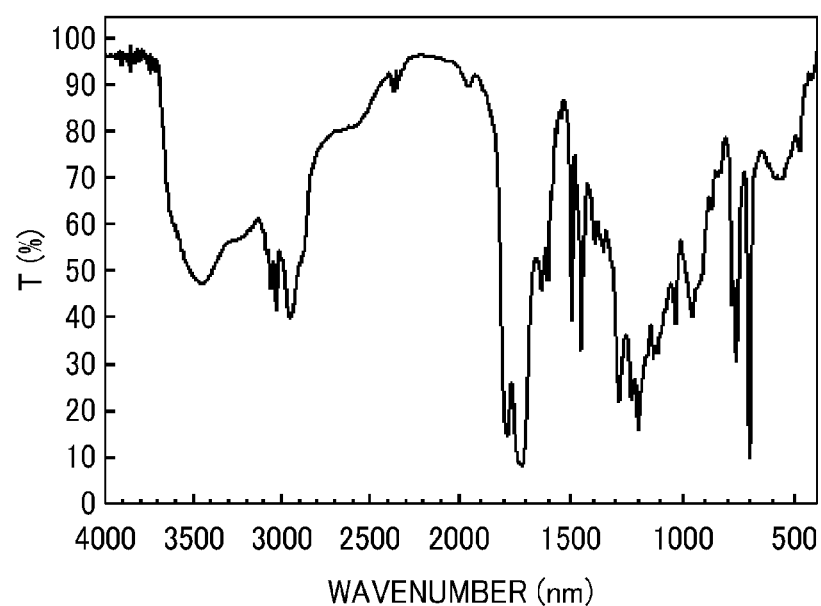
FIG. 2 is a graph illustrating the infrared absorption spectrum of Copolymer 2 according to an embodiment of the present invention.

The infrared absorption spectrum (KBr pellet method) of Copolymer 2 is illustrated in FIG. 2.

Example 3

As in Example 1, 2-naphthoic acid 6-hydroxyhexyl ester was obtained except that ethylene glycol was replaced by 1,6-hexanediol.

Subsequently, in the same manner as in Example 1, Copolymer 3 having a weight molecular weight (Mw) of 5,800 and a number of molecular weight (Mn) of 2,300. was obtained.

Figure 3:
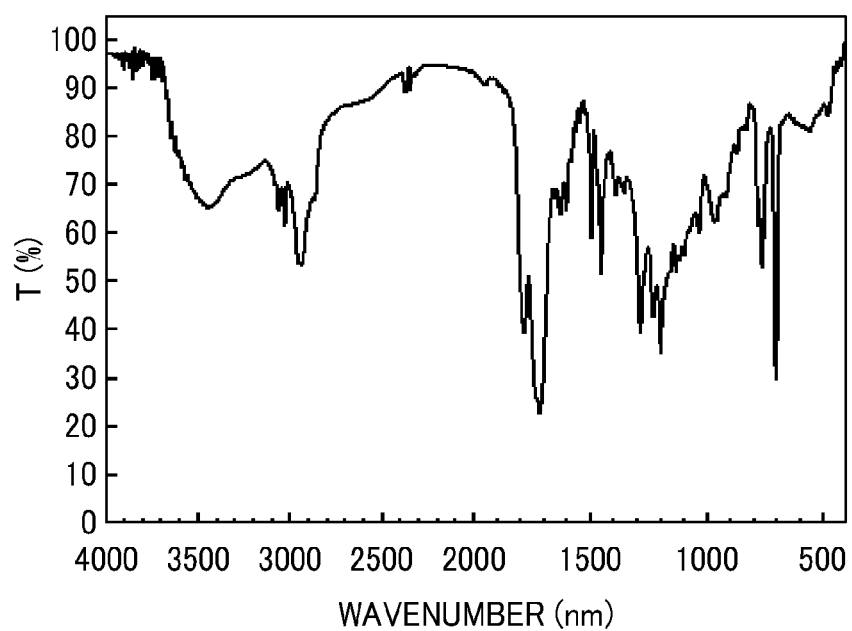
FIG. 3 is a graph illustrating the infrared absorption spectrum of Copolymer 3 according to an embodiment of the present invention.

The infrared absorption spectrum (KBr pellet method) of Copolymer 3 is illustrated in FIG. 3.

Example 4

As in Example 1, 2-naphtho c acid 12-hydroxydodecyl ester was obtained except that ethylene glycol was replaced by 1,12-dodecanediol.

Subsequently, in the same manner as in Example 1, Copolymer 4 having a weight molecular weight (Mw) of 5,800 and a number of molecular weight (Mn) of 2,300. was obtained.

Figure 4:
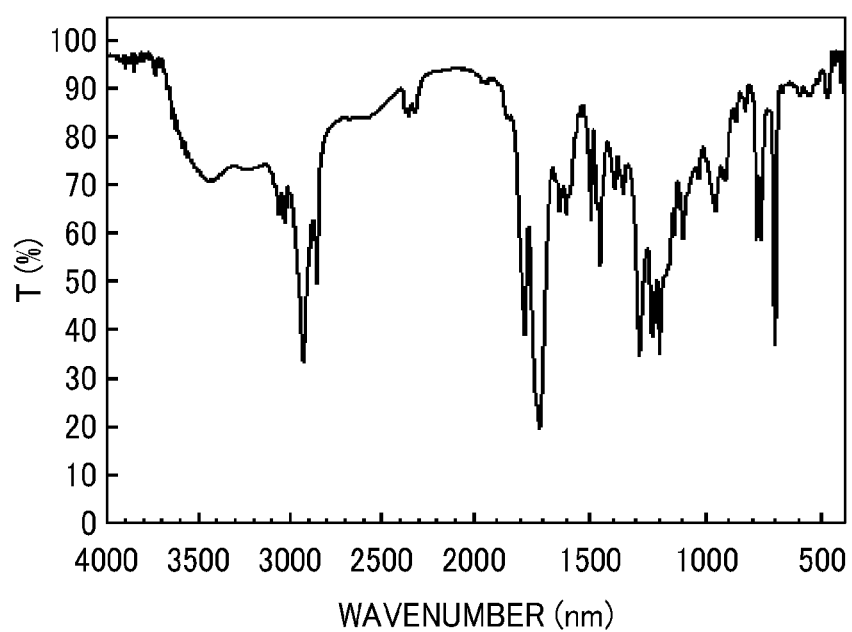
FIG. 4 is a graph illustrating the infrared absorption spectrum of Copolymer 4 according to an embodiment of the present invention.

The infrared absorption spectrum (KBr pellet method) of Copolymer 4 is illustrated in FIG. 4.

Example 5

To a solvent mixture of 80 mL of dried toluene and 15 mL of dried pyridine, 5.59 g (30 mmol) of 1,8-naphthalenedicarboxylic anhydride and 3.52 g (30 mmol) of 6-amino-1-hexanol were added. This solution was refluxed for 16 hours and then cooled to room temperature. Subsequently, the solvent was distilled off and the residue was purified by silica gel column chromatography with a toluene/ethyl acetate (7/3 to 5/5) solvent mixture serving as an eluent to provide 7.67 g of an imide compound. Subsequently, as in Example 1, this imide compound and the above-described SMA1000P were used to provide Copolymer 5 having a weight molecular weight (Mw) of 5,700 and a number of molecular weight (Mn) of 2,200.

Figure 5:
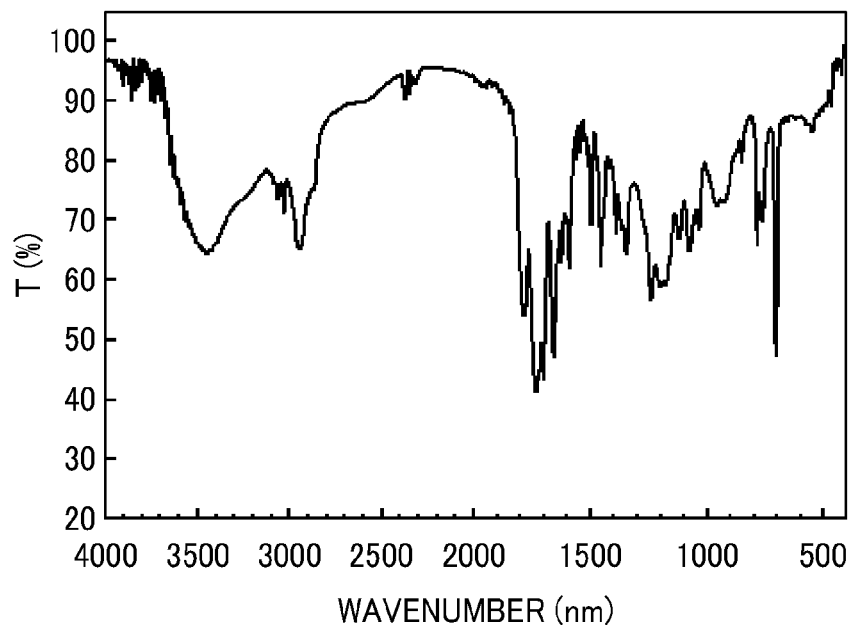
FIG. 5 is a graph illustrating the infrared absorption spectrum of Copolymer 5 according to an embodiment of the present invention.

The infrared absorption spectrum (KBr pellet method) of Copolymer 5 is illustrated in FIG. 5.

Example 6

In the same manner as in Example 1, 2-naphthoic acid 6-hydroxyhexyl ester obtained in Example 3 and a styrene-maleic anhydride copolymer [SMA2000P, manufactured by KAWAHARA PETROCHEMICAL CO., LTD., weight-average molecular weight (Mw): 7500, number-average molecular weight (Mn): 3000] were used to provide Copolymer 6 having a weight molecular weight (Mw) of 7,700 and a number of molecular weight (Mn) of 3,200.

Figure 6:
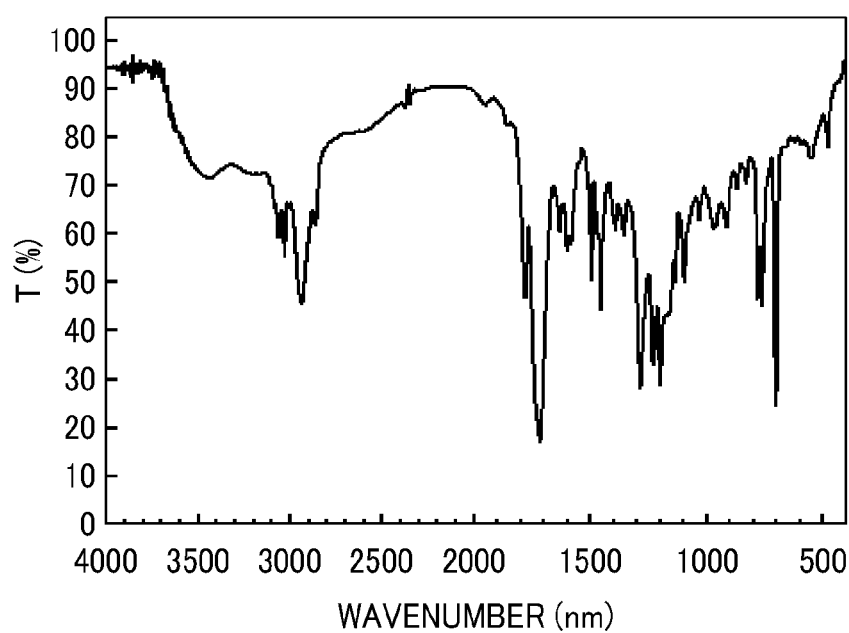
FIG. 6 is a graph illustrating the infrared absorption spectrum of Copolymer 6 according to an embodiment of the present invention.

The infrared absorption spectrum (KBr pellet method) of Copolymer 6 is illustrated in FIG. 6.

Example 7

In the same manner as in Example 1, 2-naphthoic acid 6-hydroxyhexyl ester obtained in Example 3 and a styrene-maleic anhydride copolymer [SMA3000P, manufactured by KAWAHARA PETROCHEMICAL CO., LTD., weight-average molecular weight (Mw): 9500, number-average molecular weight (Mn): 3800] were used to provide Copolymer 7 having a weight molecular weight (Mw) of 9,900 and a number of molecular weight (Mn) of 4,100.

Figure 7:
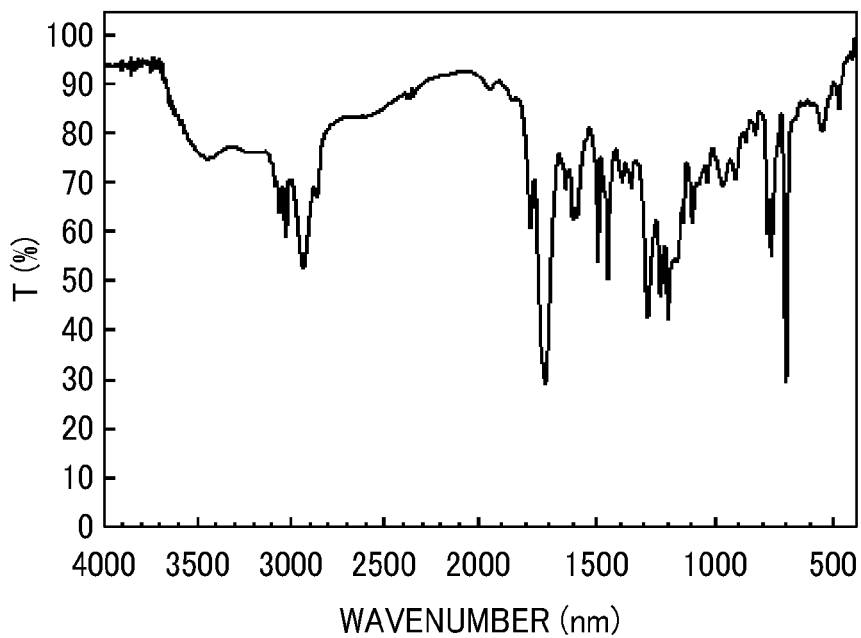
FIG. 7 is a graph illustrating the infrared absorption spectrum of Copolymer 7 according to an embodiment of the present invention.

The infrared absorption spectrum (KBr pellet method) of Copolymer 7 is illustrated in FIG. 7.

Example 8

To 80 mL of methyl ethyl ketone, 9.05 g (50 mmol) of 4-hydroxybiphenyl, 10.20 g (60 mmol) of 6-bromo-1-hexanol, and 20.7 g (150 mmol) of potassium carbonate were added. This solution was refluxed for 24 hours and then cooled to room temperature. This solution was diluted with 200 mL of methylene chloride and rinsed with water three times. The organic phase was then separated and dried over magnesium sulfate, and the solvent was distilled off. The residue was dissolved in toluene and purified by recrystallization to provide 10.25 g of 6-(4-phenylphenoxy)hexane-1-ol.

Subsequently, 0.72 g (2.7 mmol) of 6-(4-phenylphenoxy) hexane-1-ol and 1.0 g of a styrene-maleic anhydride copolymer [SMA3024, manufactured by KAWAHARA PETROCHEMICAL CO., LTD., weight-average molecular weight (Mw): 24000] were dissolved in 1 mL of dried dimethylacetamide and stirred under reflux for 2 hours. The resultant reaction solution was diluted with toluene and the solvent was distilled off. The residue was purified with a recycling HPLC (LC-9201, manufactured by Japan Analytical Industry Co., Ltd., developing solvent: tetrahydrofuran, flow rate: 3.5 mL/min) to provide 1.16 g of Copolymer 8 having a weight molecular weight (Mw) of 24,300 and a number of molecular weight (Mn) of 10,000.

Figure 8:
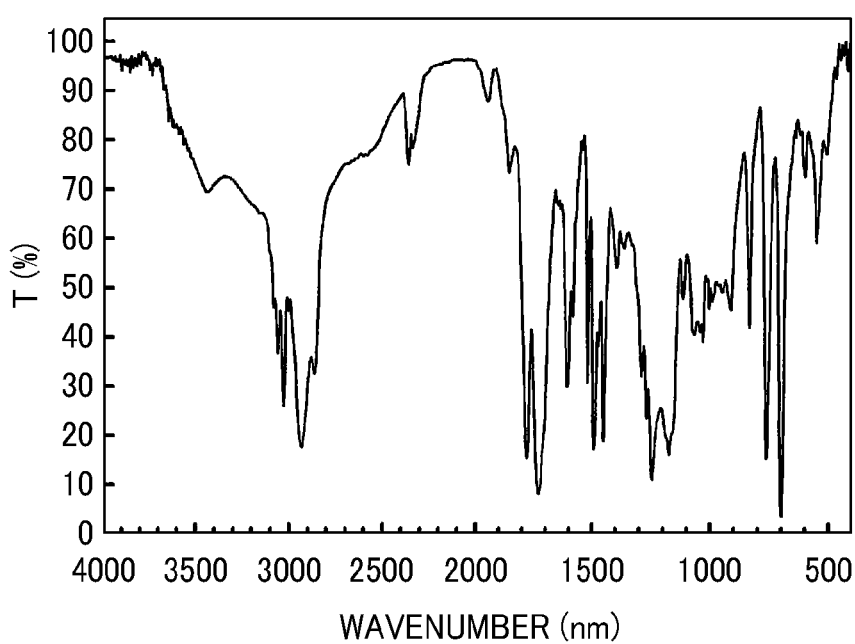
FIG. 8 is a graph illustrating the infrared absorption spectrum of Copolymer 8 according to an embodiment of the present invention.

The infrared absorption spectrum (KBr pellet method) of Copolymer 8 is illustrated in FIG. 8.

Example 9

To a solvent mixture of 130 mL of dried toluene and 30 mL of dried pyridine, 9.91 g (50 mmol) of 2,3-naphthalenedicarboxylic anhydride and 5.86 g (50 mmol) of 6-amino-1-hexanol were added, This solution was refluxed for 12 hours and then cooled to room temperature. Subsequently, the solvent was distilled off and the residue was purified by silica gel column chromatography with a toluene/ethyl acetate (7/3 to 5/5) solvent mixture serving as an eluent to provide 11.34 g of an imide compound.

Subsequently, 0.80 g (2.7 mmol) of the imide compound and 1.0 g of the above-described SMA3024 were dissolved in 1 mL of dried dimethylacetamide and stirred under reflux for 3 hours. The resultant reaction solution was diluted with toluene and the solvent was distilled off. The residue was purified with a recycling HPLC (LC-9201, manufactured by Japan Analytical Industry Co., Ltd., developing solvent: tetrahydrofuran, flow rate: 3.5 mL/min) to provide 1.21 g of Copolymer 9 having a weight molecular weight (Mw) of 24,200 and a number of molecular weight (Mn) of 10,000.

Figure 9:
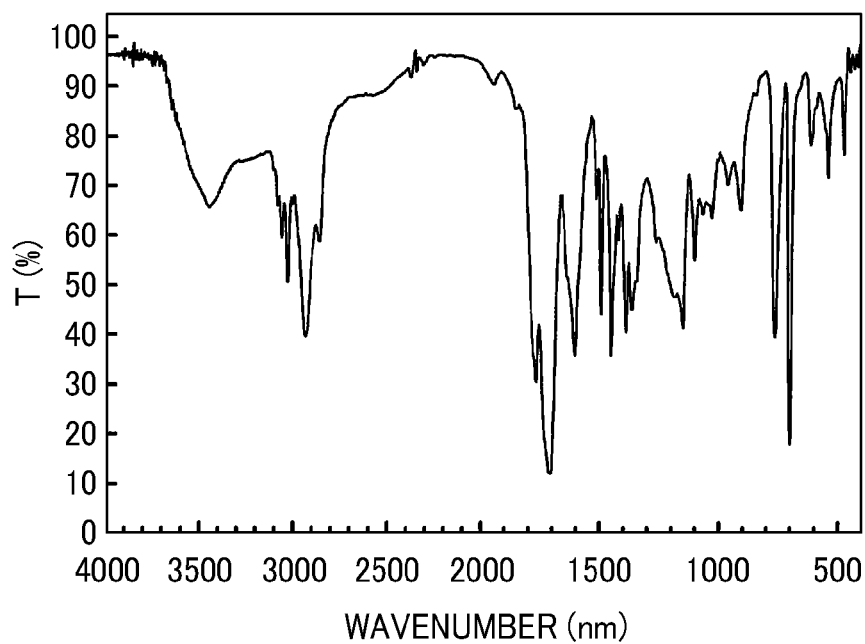
FIG. 9 is a graph illustrating the infrared absorption spectrum of Copolymer 9 according to an embodiment of the present invention.

The infrared absorption spectrum (KBr pellet method) of Copolymer 9 is illustrated in FIG. 9.

Example 10

In a solvent mixture of 150 mL of tetrahydrofuran and 30 mL of methylene chloride, 10.0 g (19.4 mmol) of 1,16-hexadecanediol was dissolved and 1.54 g (19.4 mmol) of pyridine was added. To this solution being stirred, a solution containing 3.70 g (38.8 mmol) of 2-naphthalenecarbonyl chloride dissolved in 50 mL 150 mL of tetrahydrofuran was dropped over 2 hours. This solution was then further stirred for an hour. The solvent was distilled off from the resultant reaction solution. The residue was rinsed with methanol, then rinsed with water, and dried; and this residue was purified by silica gel column chromatography with a methylene chloride/methanol (95/5) solvent mixture serving as an eluent to provide 2.06 g of 2-naphthoic acid 16-hydroxyhexadecane ester.

Subsequently, 0.32 g (0.78 mmol) of 2-naphthoic acid 16-hydroxyhexadecane ester and 0.30 g of the above-described SMA3024 were dissolved in 1 mL of dried dimethylacetamide and stirred under reflux for 2 hours. The resultant reaction solution was diluted with toluene and the solvent was distilled off. The residue was purified with a recycling HPLC (LC-9201, manufactured by Japan Analytical Industry Co., Ltd., developing solvent: tetrahydrofuran, flow rate: 3.5 mL/min) to provide 0.47 g of Copolymer 10 having a weight molecular weight (Mw) of 24,400 and a number of molecular weight (Mn) of 10,000.

Figure 10:
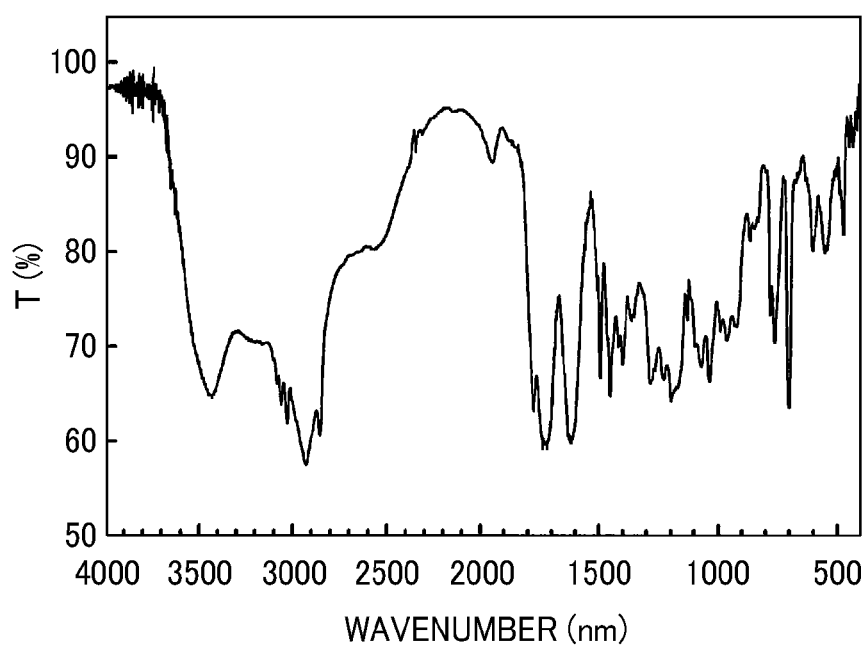
FIG. 10 is a graph illustrating the infrared absorption spectrum of Copolymer 10 according to the present invention.

The infrared absorption spectrum (KBr pellet method) of Copolymer 10 is illustrated in FIG. 10.

Example 11

Copolymer 7 (1.37 g) obtained in Example 7 was dissolved in 3 mL of Equamide M100 (manufactured by Idemitsu Kosan Co., Ltd.). Tetraethylammonium hydroxide (0.294 g) was dissolved in 12 mL of deionized water. To the resultant aqueous solution under vigorous stirring, the Equamide M100 solution of the copolymer was dropped. After the dropping was completed, the solution was stirred for about an hour and the solvent was distilled off. The residue was rinsed with deionized water and dried under a reduced pressure to provide Copolymer 11 (copolymer in which carboxyl groups of Copolymer 7 were changed to tetraethylammonium carboxylate) having a weight molecular weight (Mw) of 9,900 and a number of molecular weight (Mn) of 4,100.

Example 12

As in Example 1, 2-naphthoic acid 2-hydroxyethyl ester was obtained. After that, 10.3 g (25 mmol) of maleic anhydride and 6.81 g (25 mmol) of 2-naphthoic acid 6-hydroxyhexyl ester were dissolved in 50 mL of methyl ethyl ketone and refluxed under heating for 6 hours. The resultant reaction mixture was concentrated. The residue was purified by silica gel column chromatography with a methylene chloride/methanol (volume ratio: 9/1) solvent mixture serving as an eluent to provide 8.1 g of a compound having a structure represented by the following formula [hereafter referred to as Maleic derivative 1].

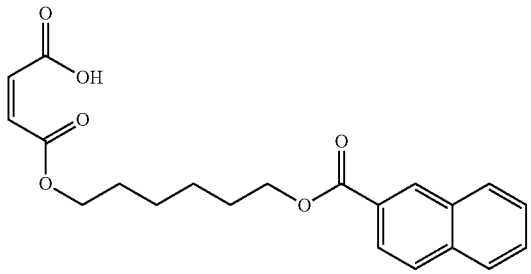 [SMILES: O=C(O)/C=C\C(=O)OCCCCCCOC(=O)c1ccc2ccccc2c1]

Subsequently, 3.20 g (8.6 mmol) of Maleic derivative 1 was dissolved in 1.80 g (17.3 mmol) of styrene. To this solution, 5.0 g of deionized water, 0.15 g of AQUALON KH-10 (anionic radical reactive surfactant manufactured by DAI-ICHI KOGYO SEIYAKU CO., LTD.), and 0.05 g of ammonium persulfate were added and treated with a homomixer to provide pre-emulsion. Subsequently, 0.1 g of AQUALON KH-10 was added to 5.0 g of deionized water and heated to 80° C. under a stream of argon. To this solution, 10% of the pre-emulsion was added and subjected to initial polymerization for 30 minutes. Subsequently, the remainder of the pre-emulsion was dropped over 2 hours to cause polymerization. After that, polymerization was further caused at 80° C. for 2 hours. This solution was cooled, then filtered, and neutralized with aqueous ammonia to provide Copolymer 12 having a solid content concentration of 30% with a weight molecular weight (Mw) of 17,000 and a number of molecular weight (Mn) of 9,000.

Figure 11:
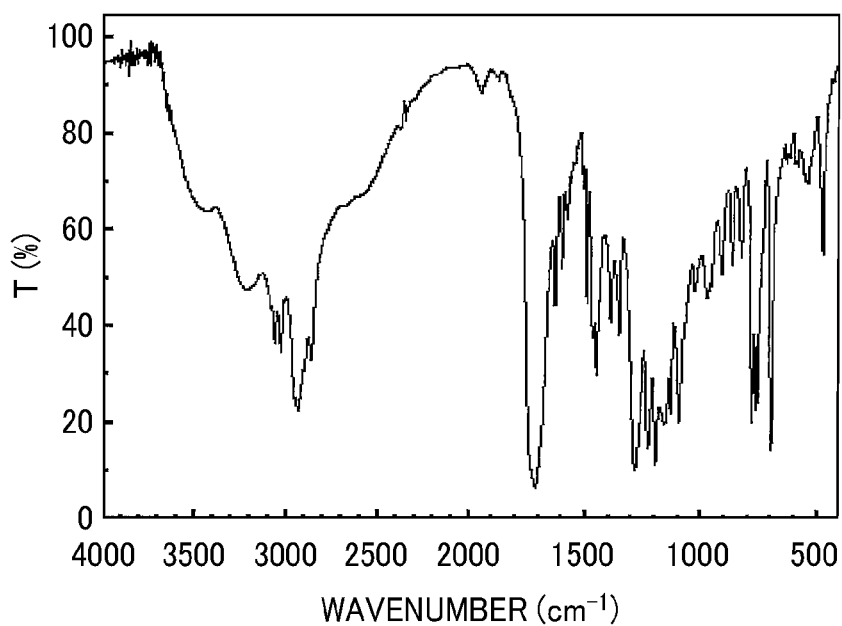
FIG. 11 is a graph illustrating the infrared absorption spectrum of Copolymer 12 according to an embodiment of the present invention.

After water was distilled off from the emulsion-state Copolymer 12 under a stream of hot air, drying under a reduced pressure was performed to provide Copolymer 12. The infrared absorption spectrum of Copolymer 12 is illustrated in FIG. 11.

Example 13

Maleic derivative 1 (3.08 g (8.32 mmol)) and 0.64 g (4.99 mmol) of butyl acrylate were dissolved in 1.73 g (16.6 mmol) of styrene. To this solution, 5.0 g of deionized water, 0.15 g of AQUALON KH-10 (anionic reactive surfactant manufactured by DAI-ICHI KOGYO SEIYAKU CO., LTD.), and 0.05 g of ammonium persulfate were added and treated with a homomixer to provide pre-emulsion. Subsequently, 0.1 g of AQUALON KH-10 was added to 5.0 g of deionized water and heated to 80° C. under a stream of argon. To this solution, 10% of the pre-emulsion was added and subjected to initial polymerization for 30 minutes. Subsequently, the remainder of the pre-emulsion was dropped over 2 hours to cause polymerization. After that, polymerization was further caused at 80° C. for 2 hours. This solution was cooled, then filtered, and neutralized with aqueous ammonia to provide Copolymer 13 having a solid content concentration of 30% with a weight molecular weight (Mw) of 2,800 and a number of molecular weight (Mn) of 10,000.

Figure 12:
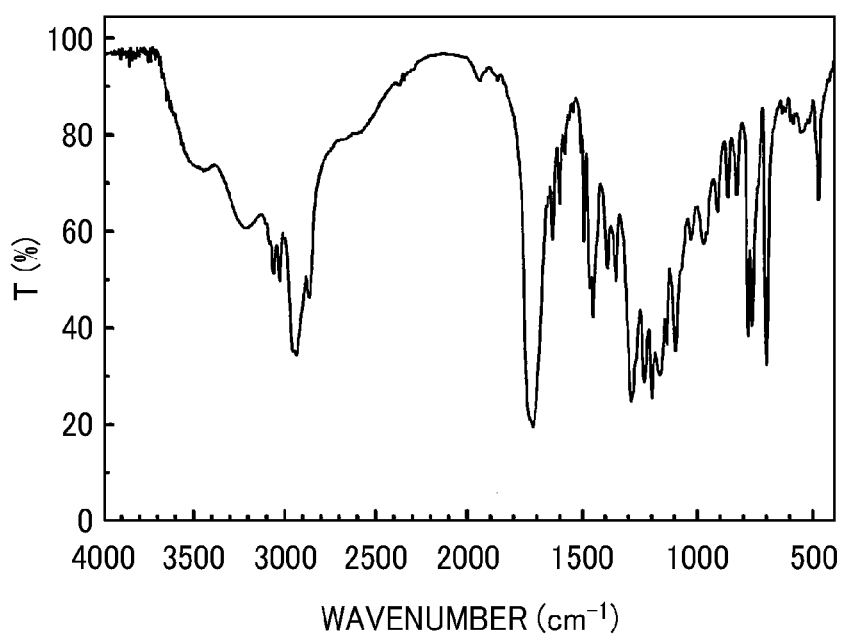
FIG. 12 is a graph illustrating the infrared absorption spectrum of Copolymer 13 according to an embodiment of the present invention.

The infrared absorption spectrum (KBr pellet method) of Copolymer 13 is illustrated in FIG. 12.

The structures of Copolymers in Examples 1 to 13 above are summarized in Table 1.

TABLE 1

| | 1:2 | n | Y | Z | R | Structural formula |
|---|---|---|---|---|---|---|
| Example 1 | 1:1 | 2 | oxycarbonyl | naphthalene | H | Specific example 1 |
| Example 2 | 1:1 | 4 | oxycarbonyl | naphthalene | H | Specific example 1 |
| Example 3 | 1:1 | 6 | oxycarbonyl | naphthalene | H | Specific example 1 |
| Example 4 | 1:1 | 12 | oxycarbonyl | naphthalene | H | Specific example 1 |
| Example 5 | 1:1 | 6 | imido | naphthalene | H | Specific example 9 |
| Example 6 | 2:1 | 6 | oxycarbonyl | naphthalene | H | Specific example 1 |
| Example 7 | 3:1 | 6 | oxycarbonyl | naphthalene | H | Specific example 1 |
| Example 8 | 3:1 | 6 | ether | biphenyl | H | Specific example 6 |
| Example 9 | 3:1 | 6 | imido | naphthalene | H | Specific example 10 |
| Example 10 | 3:1 | 16 | oxycarbonyl | naphthalene | H | Specific example 1 |
| Example 11 | 3:1 | 6 | oxycarbonyl | naphthalene | * | Salt of Specific example 1 |
| Example 12 | 2:1 | 6 | oxycarbonyl | naphthalene | H | Specific example 1 |
| Example 13 | 2:1 | 6 | oxycarbonyl | naphthalene | H | Specific example 12 |

In Example 11, in the salt of Specific example 1, "*" for R denotes a tetraethylammonium salt.

In Example 13, in Specific example 12, m represents 0 and n represents 6.

Comparative Example 1

A styrene-maleic anhydride copolymer [0.2 g, SMA1000P, manufactured by KAWAHARA PETROCHEMICAL CO., LTD., weight-average molecular weight (Mw): 5500, number-average molecular weight (Mn): 2000] and 0.30 g (3 mmol) of 1-hexanol were dissolved in 8 mL of dried dimethylformamide and stirred to react at 120° C. for 12 hours. The resultant reaction solution was diluted with toluene and the solvent was distilled off. The residue was purified with a recycling HPLC (LC-9201, manufactured by Japan Analytical Industry Co., Ltd., developing solvent: tetrahydrofuran, flow rate: 3.5 mL/min) to provide 0.21 g of Comparative copolymer 1 having a weight molecular weight (Mw) of 5,600 and a number of molecular weight (Mn) of 2,100.

Comparative Example 2

Maleic anhydride (10.3 g (25 mmol)) and 2.55 g (25 mmol) of 1-hexanol were dissolved in 50 mL of methyl ethyl ketone and refluxed under heating to react for 6 hours. The resultant reaction mixture was concentrated. The residue was purified by silica gel column chromatography with a methylene chloride/methanol (volume ratio: 9/1) solvent mixture serving as an eluent to provide 8.7 g of a compound having a structure represented by the following formula [hereafter referred to as Maleic derivative 2].

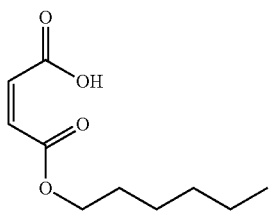

Comparative copolymer 2 having a solid content concentration of 30% with a weight molecular weight (Mw) of 17,000 and a number of molecular weight (Mn) of 7,000. was obtained as in Example 12 except that Maleic derivative 1 was replaced by Maleic derivative 2.

Example 31

Preparation of Pigment Dispersion

Copolymer 1 (5.0 parts) was dissolved in 8.0 parts of tetrahydrofuran. To this solution, 70.0 parts of deionized water and a neutralizer (sodium hydroxide solution) in an amount corresponding to 100% of the acid value of the copolymer were added to achieve neutralization. After that, 20.0 parts of carbon black (NIPEX150, manufactured by Degussa) was added and stirred. The resultant mixture was subjected to circulation dispersion with a disk-type bead mill (manufactured by SHINMARU ENTERPRISES CORPORATION, KDL-type, media: zirconia balls having a diameter of 0.1 mm) at a peripheral speed of 10 m/s for an hour. Subsequently, the solvent was distilled off with an evaporator under a reduced pressure. The residue was filtered with a membrane filter having a pore size of 1.2 μm and mixed with an adjustment amount of deionized water to provide 95.0 parts of Pigment dispersion 31 (pigment solid content concentration: 20%).

Preparation of Ink

Pigment dispersion 31 (40.0 parts), 20.0 parts of 1,3-butanediol, 10.0 parts of glycerin, 1.0 part of 2,2,4-trimethyl-1,3-pentadiol, 2.0 parts of Zonyl FS-300 (manufactured by E. I. du Pont de Nemours and Company, fluorine-based surfactant, solid content: 40% by mass), and 26.0 parts of deionized water were mixed, stirred for an hour, and then filtered with a membrane filter having a pore size of 1.2 μm to provide Aqueous ink 31 according to the present disclosure.

Example 32

Pigment dispersion 32 was obtained as in Example 31 except that Copolymer 1 used in Preparation of pigment dispersion was replaced by Copolymer 2.

Subsequently, Aqueous ink 32 according to the present disclosure was obtained as in Example 31 except that Pigment dispersion 31 used in Preparation of ink was replaced by Pigment dispersion 32.

Example 33

Pigment dispersion 33 was obtained as in Example 31 except that Copolymer 1 used in Preparation of pigment dispersion was replaced by Copolymer 3.

Subsequently Aqueous ink 33 according to the present disclosure was obtained as in Example 31 except that Pigment dispersion 1 used in Preparation of ink was replaced by Pigment dispersion 33.

Example 34

Pigment dispersion 34 was obtained as in Example 33 except that carbon black (NIPEX150, manufactured by Degussa) used in Preparation of pigment dispersion was replaced by Pigment Blue 15:3 (manufactured by Dainichiseika Color & Chemicals Mfg. Co., Ltd. CHROMOFINE BLUE, cyan pigment).

Subsequently, Aqueous ink 34 according to the present disclosure was obtained as in Example 33 except that Pigment dispersion 33 used in Preparation of ink was replaced by Pigment dispersion 34.

Example 35

Pigment dispersion 35 was obtained as in Example 33 except that carbon black (NIPEX150, manufactured by Degussa) used in Preparation of pigment dispersion was replaced by Pigment Red 122 (manufactured by Clariant, Toner magenta EO02, magenta pigment).

Subsequently, Aqueous ink 35 according to the present disclosure was obtained as in Example 33 except that Pigment dispersion 33 used in Preparation of ink was replaced by Pigment dispersion 35.

Example 36

Pigment dispersion 36 was obtained as in Example 33 except that carbon black (NIPEX150, manufactured by Degussa) used in Preparation of pigment dispersion was replaced by Pigment Yellow (manufactured by Dainichiseika Color & Chemicals Mfg. Co., Ltd., FAST YELLOW 531, yellow pigment).

Subsequently, Aqueous ink 36 according to the present disclosure was obtained as in Example 33 except that Pigment dispersion 33 used in Preparation of ink was replaced by Pigment dispersion 36.

Example 37

Pigment dispersion 37 was obtained as in Example 31 except that Copolymer 1 used in Preparation of pigment dispersion was replaced by Copolymer 4.

Subsequently, Aqueous ink 37 according to the present disclosure was obtained as in Example 31 except that Pigment dispersion 31 used in Preparation of ink was replaced by Pigment dispersion 37.

Example 38

Pigment dispersion 38 was obtained as in Example 31 except that Copolymer 1 used in Preparation of pigment dispersion was replaced by Copolymer 5.

Subsequently, Aqueous ink 38 according to the present disclosure was obtained as in Example 31 except that Pigment dispersion 31 used in Preparation of ink was replaced by Pigment dispersion 38.

Example 39

Pigment dispersion 39 was obtained as in Example 31 except that Copolymer 1 used in Preparation of pigment dispersion was replaced by Copolymer 6.

Subsequently, Aqueous ink 39 according to the present disclosure was obtained as in Example 31 except that Pigment dispersion 31 used in Preparation of ink was replaced by Pigment dispersion 39.

Example 40

Pigment dispersion 40 was obtained as in Example 31 except that Copolymer 1 used in Preparation of pigment dispersion was replaced by Copolymer 7.

Subsequently, Aqueous ink 40 according to the present disclosure was obtained as in Example 31 except that Pigment dispersion 31 used in Preparation of ink was replaced by Pigment dispersion 40.

Example 41

Pigment dispersion 41 was obtained as in Example 31 except that Copolymer 1 used in Preparation of pigment dispersion was replaced by Copolymer 8.

Subsequently, Aqueous ink 41 according to the present disclosure was obtained as in Example 31 except that Pigment dispersion 31 used in Preparation of ink was replaced by Pigment dispersion 41.

Example 42

Pigment dispersion 42 was obtained as in Example 31 except that Copolymer 1 used in Preparation of pigment dispersion was replaced by Copolymer 9.

Subsequently, Aqueous ink 42 according to the present disclosure was obtained as in Example 31 except that Pigment dispersion 31 used in Preparation of ink was replaced by Pigment dispersion 42.

Example 43

Pigment dispersion 43 was obtained as in Example 31 except that Copolymer 1 used in Preparation of pigment dispersion was replaced by Copolymer 10.

Subsequently, Aqueous ink 43 according to the present disclosure was obtained as in Example 31 except that Pigment dispersion 31 used in Preparation of ink was replaced by Pigment dispersion 43.

Example 44

Pigment dispersion 44 was obtained as in Example 31 except that Copolymer 1 used in Preparation of pigment dispersion was replaced by Copolymer 11.

Subsequently, Aqueous ink 44 according to the present disclosure was obtained as in Example 31 except that Pigment dispersion 31 used in Preparation of ink was replaced by Pigment dispersion 44.

Example 45

The following materials were mixed and stirred for 30 minutes to prepare Aqueous solution 1.

| | |
|---|---|
| 2-ethyl-1,3-hexanediol | 2.00 parts |
| glycerol | 10.00 parts |
| 3-methoxy-N,N-dimethylpropaneamide | 15.00 parts |
| 3-butoxy-N,N-dimethylpropaneamide | 15.00 parts |
| 2-(cyclohexylamino)ethanesulfonic acid | 0.05 parts |
| 2,4,7,9-tetramethyl-4,7-decanediol | 0.50 parts |
| Zonyl FS-300 (fluorine-based surfactant, manufactured by E. I. du Pont de Nemours and Company) | 0.25 parts |
| diethanolamine | 0.01 parts |
| deionized water | 12.93 parts |

Subsequently, 50 g of dried carbonblack, 100 mL of deionized water, and 15.5 g (50 mmol) of the compound represented by the following chemical formula were mixed followed by heating to 60° C. while being stirred at 300 rpm. 50 mmol 1 of 20% sodium nitrite aqueous solution was added in 15 minutes. Thereafter, the resultant was stirred at 60° for three hours. The content was diluted with 75 mL of deionized water followed by filtration. Deionized water was added in such a manner that the concentration of the solid portion was 20.0% to prepare Pigment dispersion 45 of carbon black.

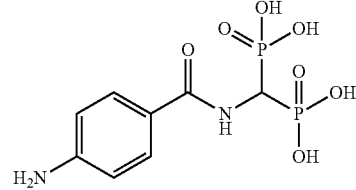 [SMILES: Nc1ccc(C(=O)NC(P(=O)(O)O)P(=O)(O)O)cc1]

Subsequently, to Aqueous solution 1, 37.50 parts of Pigment dispersion 45 was added and stirred for 30 minutes; and 6.67 parts of Copolymer 12 (solid content concentration: 30%) was further added and stirred for 30 minutes. This solution was filtered with a membrane filter having a pore size of 1.2 μm to provide Aqueous ink 45 according to the present disclosure.

Example 46

The following materials were mixed and stirred for 30 minutes to prepare Aqueous solution 2.

| | |
|---|---|
| 2-ethyl-1,3-hexanediol | 2.00 parts |
| glycerol | 10.00 parts |
| 3-methoxy-N,N-dimethylpropaneamide | 20.00 parts |
| 3-butoxy-N,N-dimethylpropaneamide | 20.00 parts |
| 2-(cyclohexylamino)ethanesulfonic acid | 0.05 parts |
| 2,4,7,9-tetramethyl-4,7-decanediol | 0.50 parts |
| Zonyl FS-300 (fluorine-based surfactant, manufactured by E. I. du Pont de Nemours and Company) | 0.25 parts |
| diethanolamine | 0.01 parts |
| deionized water | 17.93 parts |

Subsequently, 4.50 g of p-aminobenzoate was added to 150 g of deionized water heated to 60° C. followed by stirring for 10 minutes at 8,000 rpm. Thereafter, a solution in which 1.80 g of sodium nitrite was dissolved in 15 g of deionized water was added to this mixture. Immediately thereafter, 20 g of copper phthanlocyanine pigment PB 15:4 (manufactured by Sun Chemical Corporation) was added thereto followed by a one hour mixing at 8,500 rpm. Furthermore, 4.5 g of p-aminobenzoate was dissolved in 15 g of deionized water was added to this mixture followed by a three hour mixing at 8,500 rpm at 65° C. Thus-obtained reaction mixture was filtered with a mash of 200 nm. Subsequent to washing with water, the thus-obtained cyan pigment was dispersed in water. Coarse particles were removed by a centrifugal and deionized water was added in such a manner that the concentration of the solid portion was 20.0% to obtain Pigment dispersion 46 of cyan pigment which was surface-treated with p-aminobenzoate.

Subsequently, to Aqueous solution 2, 22.50 parts of Pigment dispersion 46 was added and stirred for 30 minutes; and 6.67 parts of Copolymer 13 (solid content concentration: 30%) was further added and stirred for 30 minutes. This solution was then filtered with a membrane filter having a pore size of 1.2 μm to provide Aqueous ink 46 according to the present disclosure.

Example 47

As in Example 45, Aqueous solution 1 was prepared.

Subsequently, 4.50 g of sulfanilic acid was added to 150 g of deionized water heated to 60° C. followed by stirring for 10 minutes at 8,000 rpm. Thereafter, a solution in which 1.80 g of sodium nitrite was dissolved in 15 g of deionized water was added to this mixture. Immediately thereafter, 20 g of magenta pigment PR 122 (manufactured by Sun Chemical Corporation) was added thereto followed by a one hour mixing at 8,500 rpm. Furthermore, 4.5 g of sulfanilic acid was dissolved in 15 g of deionized water was added to this mixture followed by a three hour mixing at 8,500 rpm at 65° C. Thus-obtained reaction mixture was filtered with a mash of 200 nm. Subsequent to washing with water, the thus-obtained cyan pigment was dispersed in water. Coarse particles were removed by a centrifugal and deionized water was added in such a manner that the concentration of the solid portion was 20.0% to obtain Pigment dispersion 47 of magenta pigment which was surface-treated with sulfanilic acid Subsequently, to Aqueous solution 1, 22.50 parts of Pigment dispersion 47 was added and stirred for 30 minutes; and 6.67 parts of Copolymer 13 (solid content concentration: 30%) was further added and stirred for 30 minutes. This solution was then filtered with a membrane filter having a pore size of 1.2 μm to provide Aqueous ink 47 according to the present disclosure.

Example 48

As in Example 46, Aqueous solution 2 was prepared. To Aqueous solution 2, 37.50 parts of Pigment dispersion 34 (cyan pigment, solid content: 20.0%) prepared in Example 34 was added and stirred for 30 minutes; and 6.67 parts of Copolymer 13 (solid content concentration: 30%) was then added and stirred for 30 minutes. This solution was then filtered with a membrane filter having a pore size of 1.2 μm to provide Aqueous ink 48 according to the present disclosure.

Comparative Example 21

Comparative pigment dispersion 21 was obtained as in Example 31 except that Copolymer 1 used in Preparation of pigment dispersion was replaced by Comparative copolymer 1.

Subsequently, Comparative aqueous ink 21 was obtained as in Example 31 except that Pigment dispersion 31 used in Preparation of ink was replaced by Comparative pigment dispersion 21.

Comparative Example 22

Comparative pigment dispersion 22 was obtained as in Example 34 except that Copolymer 3 used in Preparation of pigment dispersion was replaced by Comparative copolymer 1.

Subsequently, Comparative aqueous ink 22 was obtained as in Example 34 except that Pigment dispersion 34 used in Preparation of ink was replaced by Comparative pigment dispersion 22.

Comparative Example 23

Comparative pigment dispersion 23 was obtained as in Example 35 except that Copolymer 3 used in Preparation of pigment dispersion was replaced by Comparative copolymer 1.

Subsequently, Comparative aqueous ink 23 was obtained as in Example 35 except that Pigment dispersion 35 used in Preparation of ink was replaced by Comparative pigment dispersion 23.

Comparative Example 24

Comparative pigment dispersion 24 was obtained as in Example 36 except that Copolymer 3 used in Preparation of pigment dispersion was replaced by Comparative copolymer 1.

Subsequently, Comparative aqueous ink 24 was obtained as in Example 36 except that Pigment dispersion 36 used in Preparation of ink was replaced by Comparative pigment dispersion 24.

Comparative Example 25

As in Example 46, Aqueous solution 2 was prepared. To Aqueous solution 2, 22.50 parts of Pigment dispersion 46 (cyan pigment, solid content: 20.0%) prepared in Example 46 was added and stirred for 30 minutes; and 6.67 parts of Comparative copolymer 2 (solid content concentration: 30%) was then added and stirred for 30 minutes, This solution was then filtered with a membrane filter having a pore size of 1.2 μm to provide Comparative aqueous ink 25.

Comparative Example 26

As in Example 47, Aqueous solution 1 was prepared. To Aqueous solution 1, 37.50 parts of Pigment dispersion 47 (magenta pigment, solid content: 20.0%) prepared in Example 47 was added and stirred for 30 minutes; and 6.67 parts of Comparative copolymer 2 (solid content concentration: 30%) was then added and stirred for 30 minutes. This solution was then filtered with a membrane filter having a pore size of 1.2 μm to provide Comparative aqueous ink 26.

Comparative Example 27

As in Comparative example 22, Comparative pigment dispersion 22 was prepared. To Comparative pigment dispersion 22, 6.67 parts of Comparative copolymer 2 (solid content concentration: 30%) was added and stirred for 30 minutes. This solution was then filtered with a membrane filter having a pore size of 1.2 μm to provide Comparative aqueous ink 27.

Characteristics of Aqueous inks prepared in Examples and Comparative examples were evaluated by methods described below. The results are summarized in Table 2.

Image Density

In an environment at 23° C. and 50% RH, each ink was charged into an inkjet printer (manufactured by Ricoh Company, Ltd., IPSiO GX5000); a chart of the general symbol (64 points) of JIS X 0208(1997), 2223 formed with Microsoft Word 2000 (manufactured by Microsoft Corporation) was printed on Normal paper sheet 1 (XEROX4200, manufactured by Xerox Corporation) and Normal paper sheet 2 (My-Paper, manufactured by Ricoh Company, Ltd.); the symbol regions in the printing surfaces were measured by colorimetry with X-Rite938 (manufactured by X-Rite, Incorporated) and evaluated using grades described below.

The printing mode used was "Normal paper—Standard Quick" mode that was modified to "Without color correction" in Normal paper user setting with the driver attached to the printer.

JIS X 0208(1997), 2223 described above represents a symbol having a square shape entirely filled with ink.

Evaluation grades
A: 1.25 or more
B: 1.20 or more and less than 1.25
C: 1.10 or more and less than 1.20
D: less than 1.10
E: pigment is not dispersed in ink due to gelation and printing is not achieved Ink Storage Stability Each ink was charged into an ink cartridge and stored at 60° C. for a week. The change ratio of a viscosity after storage to a viscosity before storage was determined with the following formula and evaluated using grades described below.

Change ratio of viscosity(%)=(Ink viscosity after storage/Ink viscosity before storage)×100

In the viscosity measurement, a viscometer (RE80L, manufactured by Toki Sangyo Co., Ltd.) was used and a viscosity at 25° C. was measured at 50 revolutions.

Evaluation Grades
A: viscosity change ratio is within ±5%
B: viscosity change ratio is beyond ±5% and within ±8%
C: viscosity change ratio is beyond ±8% and within ±10%
D: viscosity change ratio is beyond ±10% and within ±30%
E: viscosity change ratio is beyond ±30% (evaluation is not achieved due to gelation)

Beading

Figure 15:
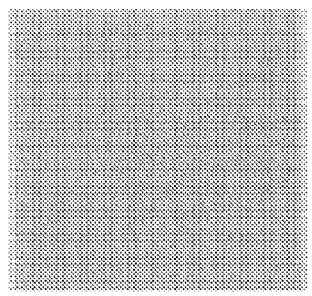
FIG. 15 is diagrams illustrating evaluation grades A to E in Beading.
Figure 15:
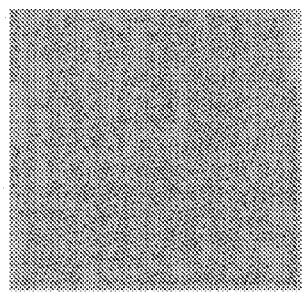
Figure 15:
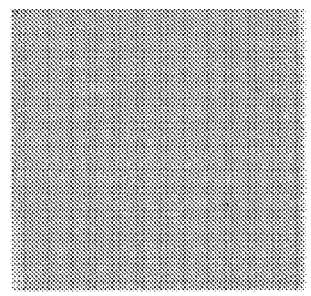
Figure 15:
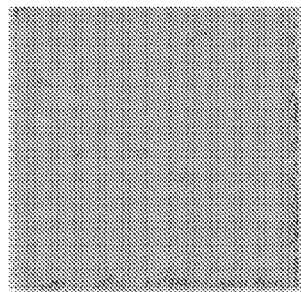
Figure 15:
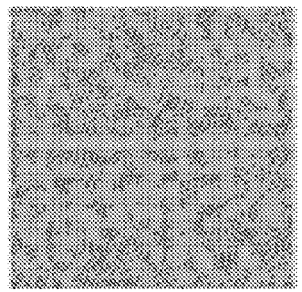

The general symbol of JIS X 0208(1997), 2223 was printed as in the image density evaluation except that Printing paper sheet LumiArt Gloss 90GSM (registered trademark) (manufactured by Stora Enso) was used as a recording medium and the printing mode was "Glossy paper—Quick" mode, and evaluated using grades described below. Printing status images corresponding to evaluation grades A to E are provided in FIG. 15. In the images of A to E, between print regions represented by square dots, missing-dot regions are observed and the number of missing-dot regions gradually increases from A to E.

Evaluation Grades
A: No beading observed
B: Beading observed in 0% to 20% of entire image
C: Beading observed in 21% to 40% of entire image
D: Beading observed in 41% to 90% of entire image
E: Beading observed all over entire image
F: Pigment was not dispersed in ink due to gelation and printing was not achieved.

TABLE 2

| | Copolymer | | | Image density | | | |
| --- | --- | --- | --- | --- | --- | --- | --- |
| | | | | Normal | Normal | | |
| | Type | Method of usage | Colorant | paper sheet 1 | paper sheet 2 | Storage stability | Beading |
| Example 31 | Copolymer 1 | Pigment dispersion | Carbon black | B | C | B | B |
| Example 32 | Copolymer 2 | Pigment dispersion | Carbon black | B | B | A | B |
| Example 33 | Copolymer 3 | Pigment dispersion | Carbon black | A | A | A | B |
| Example 34 | Copolymer 3 | Pigment dispersion | Cyan pigment | A | A | A | C |
| Example 35 | Copolymer 3 | Pigment dispersion | Magenta pigment | A | A | A | C |
| Example 36 | Copolymer 3 | Pigment dispersion | Yellow pigment | A | A | A | B |
| Example 37 | Copolymer 4 | Pigment dispersion | Carbon black | A | B | A | B |
| Example 38 | Copolymer 5 | Pigment dispersion | Carbon black | A | A | B | B |
| Example 39 | Copolymer 6 | Pigment dispersion | Carbon black | A | A | A | B |
| Example 40 | Copolymer 7 | Pigment dispersion | Carbon black | A | B | A | B |
| Example 41 | Copolymer 8 | Pigment dispersion | Carbon black | A | B | A | B |
| Example 42 | Copolymer 9 | Pigment dispersion | Carbon black | A | B | C | B |
| Example 43 | Copolymer 10 | Pigment dispersion | Carbon black | B | B | A | B |
| Example 44 | Copolymer 11 | Pigment dispersion | Carbon black | B | B | B | B |
| Example 45 | Copolymer 12 | Addition | Carbon black | A | A | A | A |
| Example 46 | Copolymer 13 | Addition | Cyan pigment | A | A | A | A |
| Example 47 | Copolymer 13 | Addition | Magenta pigment | A | A | C | A |
| Example 48 | Copolymers 3, 13 | Pigment dispersion, addition | Cyan pigment | A | A | A | A |

TABLE 2-continued

|  | Copolymer | | | Image density | | | |
|---|---|---|---|---|---|---|---|
|  | Type | Method of usage | Colorant | Normal paper sheet 1 | Normal paper sheet 2 | Storage stability | Beading |
| Comparative example 21 | Comparative copolymer 1 | Pigment dispersion | Carbon black | C | D | D | B |
| Comparative example 22 | Comparative copolymer 1 | Pigment dispersion | Cyan pigment | D | D | D | D |
| Comparative example 23 | Comparative copolymer 1 | Pigment dispersion | Magenta pigment | D | D | D | D |
| Comparative example 24 | Comparative copolymer 1 | Pigment dispersion | Yellow pigment | D | D | D | D |
| Comparative example 25 | Comparative copolymer 2 | Addition | Cyan pigment | C | D | D | C |
| Comparative example 26 | Comparative copolymer 2 | Addition | Magenta pigment | C | C | E | C |
| Comparative example 27 | Comparative copolymers 1, 2 | Pigment dispersion, addition | Cyan pigment | E | E | E | F |

As described above, the present disclosure can provide a novel copolymer that is useful as a binder resin or a pigment dispersion resin of an aqueous ink.

That is, by using a copolymer according to the present disclosure as a binder resin of an aqueous ink, images having high resolution and definition on various printing media can be obtained at a high speed.

By using a copolymer according to the present disclosure as a dispersion resin for a pigment, a pigment dispersion that is stable and has high dispersibility can be obtained.

Use of an aqueous ink containing a copolymer according to the present disclosure allows high image density even in recording on conventional paper sheets. The aqueous ink has high storage stability and does not cause beading (unevenness) even in high-speed printing.

Having now fully described embodiments of the present invention, it will be apparent to one of ordinary skill in the art that many changes and modifications can be made thereto without departing from the spirit and scope of embodiments of the invention as set forth herein.

What is claimed is:

1. A copolymer comprising:
  repeating units represented by the following chemical formulae 1 and 2:

Chemical formula 1 and 2

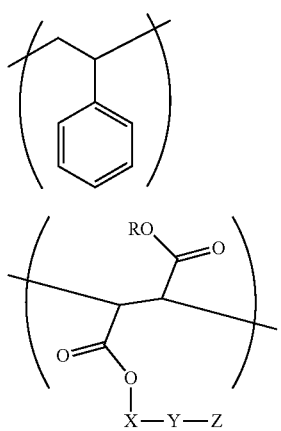

(1)

(2)

where R represents a hydrogen atom or a cation; X represents an alkylene group having 2 to 18 carbon atoms; Y represents a single bond, an oxycarbonyl group [(X)—O—CO—(Z)], a carbonyloxy group [(X)—CO—O—(Z)], an ether group (—O—), or an imido group [(X)—N—CO—(—CO—)(Z)]; and Z represents a biphenyl group or a naphthyl group).

2. The copolymer according to claim 1, wherein a ratio of the repeating units represented by the chemical formulae 1 and 2 satisfies chemical formulae 1:2=1:1 to 3:1.

3. The copolymer according to claim 1, wherein Z in the chemical formula 2 represents a naphthyl group.

4. The copolymer according to claim 1, further comprising a repeating unit represented by the following chemical formula 3.

Chemical formula 3

(3)

where R1 represents a hydrogen atom or a methyl group; and R2 represents an alkyl group having 2 to 23 carbon atoms.

5. An aqueous ink comprising:
  water,
  a colorant, and
  the copolymer of claim 1.

6. The aqueous ink according to claim 5, wherein the colorant s a pigment.

7. The aqueous ink according to claim 5, further comprising at least a water-soluble organic solvent or a surfactant.

8. An ink cartridge comprising:
  an ink container; and
  the aqueous ink of claim 5 accommodated in the ink container.

* * * * *